United States Patent
Kaizuka et al.

(10) Patent No.: US 7,548,005 B2
(45) Date of Patent: Jun. 16, 2009

(54) ELECTRIC MOTOR HAVING IMPROVED RELATIVE PHASE CONTROL

(75) Inventors: Masaaki Kaizuka, Utsunomiya (JP); Hiromitsu Sato, Kawachi-gun (JP); Hirofumi Atarashi, Shioya-gun (JP); Shoei Abe, Kawachi-gun (JP)

(73) Assignee: Honda Motor Co.Ltd., Tokyo (JP)

(*) Notice: Subject to any disclaimer, the term of this patent is extended or adjusted under 35 U.S.C. 154(b) by 55 days.

(21) Appl. No.: 11/802,307

(22) Filed: May 22, 2007

(65) Prior Publication Data

US 2007/0273235 A1    Nov. 29, 2007

(30) Foreign Application Priority Data

May 24, 2006 (JP) ............................. 2006-143789
Sep. 4, 2006  (JP) ............................. 2006-239505

(51) Int. Cl.
*H02K 16/00* (2006.01)
(52) U.S. Cl. ................... 310/114; 310/113; 180/65.1
(58) Field of Classification Search ................. 310/114, 310/112, 266, 156.53, 156.56, 113; 180/65.1, 180/65.5
See application file for complete search history.

(56) References Cited

U.S. PATENT DOCUMENTS

| | | | | |
|---|---|---|---|---|
| 5,675,203 A | * | 10/1997 | Schulze et al. ............ | 310/113 |
| 5,880,544 A | * | 3/1999 | Ikeda et al. ............... | 310/74 |
| 6,049,152 A | * | 4/2000 | Nakano .................... | 310/114 |
| 6,114,784 A | * | 9/2000 | Nakano .................... | 310/59 |
| 6,121,705 A | * | 9/2000 | Hoong ..................... | 310/113 |
| 6,563,246 B1 | * | 5/2003 | Kajiura et al. ............. | 310/162 |
| 6,624,545 B1 | * | 9/2003 | Furuse ..................... | 310/217 |
| 6,710,492 B2 | * | 3/2004 | Minagawa ................ | 310/113 |
| 2003/0090167 A1 | | 5/2003 | Kajiura et al. | |
| 2004/0041485 A1 | | 3/2004 | Horber | |

FOREIGN PATENT DOCUMENTS

| | | |
|---|---|---|
| EP | 1 191 673 A2 | 3/2002 |
| JP | 08-275419 A | 10/1996 |
| JP | 2002-058223 A | 2/2002 |
| JP | 2002-204541 A | 7/2002 |
| JP | 2002-281695 A | 9/2002 |
| JP | 2002-345299 | 11/2002 |
| JP | 2003-129812 A | 5/2003 |
| JP | 2004-72978 A | 3/2004 |
| WO | WO 92/20131 A2 | 11/1992 |

* cited by examiner

*Primary Examiner*—Michael C Zarroli
(74) *Attorney, Agent, or Firm*—Arent Fox LLP

(57) ABSTRACT

This electric motor includes first permanent magnets secured integrally to an outer periphery side rotor and second permanent magnets secured integrally to an inner periphery side rotor. The first permanent magnets and the second permanent magnets are arranged so as to offset the relative torque produced between the outer periphery side rotor and the inner periphery side rotor based on the magnetic flux of the inner peripheral permanent magnets and the outer peripheral permanent magnets.

12 Claims, 12 Drawing Sheets

ELECTRIC MOTOR HAVING IMPROVED RELATIVE PHASE CONTROL

BACKGROUND OF THE INVENTION

Priority is claimed on Japanese Patent Application No. 2006-143789, filed May 24, 2006, and Japanese Patent Application No. 2006-239505, filed Sep. 4, 2006, the contents of which are incorporated herein by reference.

FIELD OF THE INVENTION

The present invention relates to an electric motor, the rotor of which provided with permanent magnets. The present invention also relates to an electric motor in which the magnetic field characteristics of the permanent magnets of the rotor can be changed.

DESCRIPTION OF THE RELATED ART

Conventionally, an electric motor is known which provided with first and second rotors (an inner periphery side rotor and an outer periphery side rotor) arranged in concentric circles around a rotation axis of the electric motor, in which the relative position, that is the phase difference, of the first and second rotors in the circumferential direction is controlled according to the rotational speed of the electric motor, or the speed of the rotating magnetic field generated in the stator (refer to Japanese Unexamined Patent Application, First Publication No. 2002-204541).

With this electric motor, if for example the phase difference of the first and second rotors is controlled according to the rotational speed of the electric motor, the relative positions of the first and second rotors in the circumferential direction are changed via a member which is displaced in the radial direction by the effects of centrifugal force. Furthermore, if the phase difference of the first and second rotors is controlled according to the speed of the rotating magnetic field generated in the stator, the relative positions of the first and second rotors in the circumferential direction are changed by energizing the stator windings with a control current in a state where the rotational speed of each rotor is maintained by inertia, thereby changing the rotating magnetic field speed.

However, with the electric motor according to this conventional example, if the phase difference of the first and second rotors is controlled according to the rotational speed of the electric motor, for example, a problem occurs in that the phase difference of the first and second rotors can only be controlled when the electric motor is operating, that is while an amount of centrifugal force commensurate with the rotational speed is applied, and cannot be controlled at certain other times including when the electric motor is stopped. Furthermore, in some situations where external vibrations tend to be transmitted to the electric motor, such as when the electric motor is installed in a vehicle as a drive source, a problem occurs in that centrifugal force alone is insufficient for controlling the phase difference of the first and second rotors adequately. Furthermore, in this case, because the phase difference is controlled without considering fluctuation in the power supply voltage supplied to the motor, there is a problem, for example, of the magnitude relation between the power supply voltage and the induced voltage of the electric motor becoming reversed.

Furthermore, if for example the phase difference of the first and second rotors is controlled according to the speed of the rotating magnetic field generated in the stator, a problem occurs in that the control processing of the electric motor is complicated by the fact that changes occur in the rotating magnetic field speed.

In accordance with the above circumstances, an object of the present invention is to provide an electric motor which, without further complicating the motor design, uses a construction that allows a variable induced voltage constant that can be easily and suitably adjusted, allows a wider operable RPM range and torque range, provides improved operating efficiency, and increases the range in which the electric motor can operate efficiently.

Furthermore, in conventional electric motors as described above, by arranging the permanent magnets of the outer periphery side rotor and the inner periphery side rotor (first and second rotors) so that the unlike poles face each other (in an unlike-pole facing arrangement), the field magnet of the whole rotor is enhanced and the induced voltage increases, and conversely, by arranging the permanent magnets of the outer periphery side rotor and the inner periphery side rotor (first and second rotors) so that the like poles face each other (in a like-pole facing arrangement), the field magnet of the whole rotor is weakened and the induced voltage is reduced.

However, with such a conventional electric motor, the relative phase of the outer periphery side rotor and the inner periphery side rotor can only be changed under a restricted set of circumstances, and cannot be changed freely while the motor is stopped or at any given time during operation. In particular, when used to drive a hybrid or electric vehicle, it is preferable that the desired electric motor characteristics can be changed instantaneously in response to the operating status of the vehicle, and it is important in order to fulfill this requirement that the relative phase can be controlled with a high degree of freedom. Thus, the applicant have considered incorporating a phase changing device which provides a high degree of freedom in terms of controlling changes in the relative phase, but the attraction and repulsion forces between the permanent magnets of the outer periphery side rotor and the inner periphery side rotor act as an impediment to advancing the development of the electric motor.

In other words, with the conventional electric motor described above, because the attraction and repulsion forces of the permanent magnets of the outer periphery side rotor and the inner periphery side rotor act in the rotation direction according to the relative torque of both rotors as shown in FIG. 12, a large force sufficient to overcome these attraction and repulsion forces is required in order to change the relative phase of the outer periphery side rotor and the inner periphery side rotor. For this reason, in a conventional electric motor, a large amount of energy is lost to the operation of the phase changing device, which, unavoidably, increases in size.

Thus, another object of the present invention is to provide an electric motor which can reduce the amount of energy lost to phase changing and allow miniaturization of the phase changing device, by controlling the effect of the attraction and repulsion forces of the permanent magnets which act in the rotation direction when the relative phase of the outer periphery side rotor and the inner periphery side rotor is changed.

SUMMARY OF THE INVENTION

In order to solve the above problems, the present invention employs the followings.

That is, an electric motor of the present invention is provided with: a rotating device capable of changing the relative phase between the inner periphery side rotor having inner peripheral permanent magnets arranged along the circumferential direction and the outer periphery side rotor having outer peripheral permanent magnets arranged along the circumferential direction, rotation axes of the inner periphery side rotor and the outer periphery side rotor being concentric, by rotating one or the other about the rotation axis; first permanent magnets secured integrally to the outer periphery side rotor; and second permanent magnets secured integrally to the inner periphery side rotor, wherein the first permanent magnets and the second permanent magnets are arranged so as to offset the relative torque produced between the outer periphery side rotor and the inner periphery side rotor based on the magnetic flux of the inner peripheral permanent magnets and the outer peripheral permanent magnets.

In a state where the unlike magnetic poles of the inner peripheral permanent magnets and the outer peripheral permanent magnets are disposed to face each other, the first permanent magnets and the second permanent magnets may be arranged such that the like magnetic poles face each other.

In a state where the unlike magnetic poles of the inner peripheral permanent magnets and the outer peripheral permanent magnets are disposed to face each other, the first permanent magnets and the second permanent magnets may be arranged such that unlike magnetic poles face each other along the direction of rotation of the rotating device.

The first permanent magnets and the second permanent magnets may also be disposed to face each other along the radial direction of the outer periphery side rotor and the inner periphery side rotor.

The first permanent magnets and the second permanent magnets may also be arranged to face each other along the axial direction of the outer periphery side rotor and the inner periphery side rotor.

It may be arranged such that: the rotating device be provided with a first member which rotates integrally with the outer periphery side rotor, and a second member which rotates integrally with the inner periphery side rotor and which together with the first member forms pressure chambers on the inside of the inner periphery side rotor, such that the relative phase between the outer periphery side rotor and the inner periphery side rotor can be changed by supplying hydraulic fluid to the pressure chambers; and the first member be provided with the first permanent magnets, while the second member be provided with the second permanent magnets.

The first permanent magnets and the second permanent magnets may be disposed in a position such that the amount of interference applied by the magnetic fluxes of the first permanent magnets and the second permanent magnets to the field magnetic flux of the inner peripheral permanent magnets and the outer peripheral permanent magnets which links to the stator windings is kept below a predetermined level.

The electric motor may have a construction in which the inner peripheral permanent magnets which serve as the second permanent magnets are magnetized in substantially the radial direction and are disposed such that each magnetic pole faces the unlike pole of the adjacent magnet in the circumferential direction, and the outer periphery side rotor is provided with; a first rotor layer in which the first permanent magnets magnetized substantially in the radial direction are arranged such that each magnetic pole faces the unlike pole of the adjacent permanent magnet in the circumferential direction, and a second rotor layer in which the outer peripheral permanent magnets magnetized substantially in the circumferential direction are arranged so that each magnetic pole faces the like pole of the adjacent permanent magnet in the circumferential direction.

The outer peripheral permanent magnets and the first permanent magnets may be set so that the attraction and repulsion forces applied to the inner peripheral permanent magnets from the first rotor layer side are the inverse of the attraction and repulsion forces applied from the second rotor layer side at an arbitrary relative phase between the inner periphery side rotor and the outer periphery side rotor.

In the outer periphery side rotor, either one of the first rotor layer and the second rotor layer may be disposed at the center in the axial direction, and the other disposed on both sides thereof in the axial direction.

The electric motor may have a construction in which the inner peripheral permanent magnets are magnetized in substantially the radial direction and are arranged such that each magnetic pole faces the unlike pole of the adjacent permanent magnet in the circumferential direction, and the outer periphery side rotor is provided with; the first permanent magnets magnetized substantially in the radial direction which are arranged such that each magnetic pole faces the unlike pole of the adjacent permanent magnet in the circumferential direction, and the outer peripheral permanent magnets magnetized substantially in the circumferential direction which are arranged such that each magnetic pole faces the like pole of the adjacent permanent magnet in the circumferential direction.

The first permanent magnets and the outer peripheral permanent magnets may be set so that at an arbitrary relative phase of the inner periphery side rotor and the outer periphery side rotor, the attraction and repulsion forces that apply to the inner peripheral permanent magnets from the first permanent magnet side are the inverse of those that apply from the outer peripheral permanent magnet side.

DETAILED DESCRIPTION OF THE INVENTION

EMBODIMENT 1

A first embodiment of an electric motor of the present invention will be explained below with reference to the appended drawings.

Figure 1:
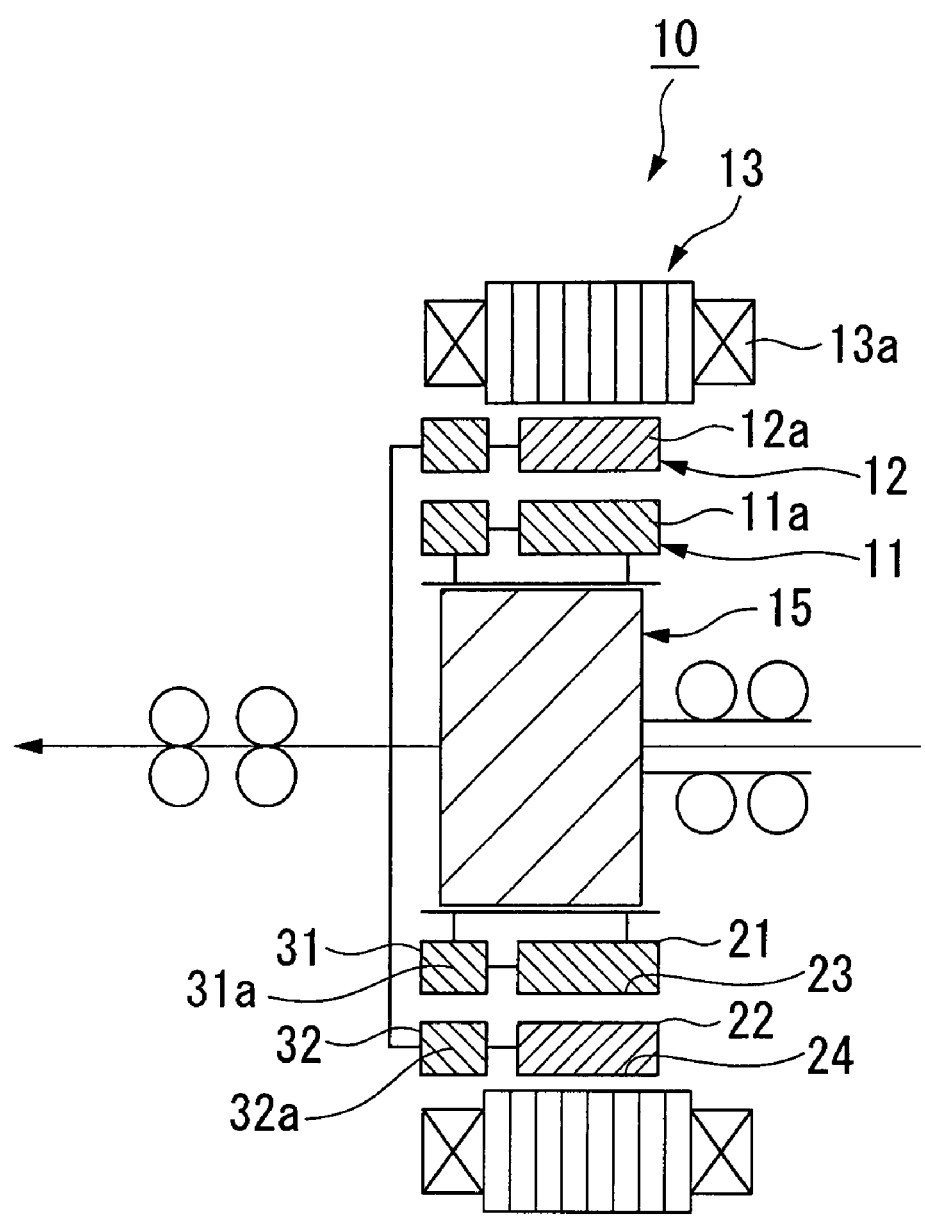
FIG. 1 is a schematic drawing showing the construction of an electric motor according to a first embodiment of the present invention.

An electric motor 10 of the present embodiment, as shown in FIG. 1 for example, is a brushless DC motor having a substantially annular inner periphery side rotor 11 and an outer periphery side rotor 12 having permanent magnets 11a and 12a, respectively, disposed around the circumferential direction thereof, a stator 13 having a multiphase stator winding 13a which generates a rotating magnetic field that rotates the inner periphery side rotor 11 and the outer periphery side rotor 12, and a phase control apparatus 15 which is connected to the inner periphery side rotor 11 and the outer periphery side rotor 12 and controls the relative phase between the two. This electric motor 10 is installed as the drive source in a hybrid or electric vehicle, for example, and by connecting the output shaft of the electric motor 10 to the input shaft of a transmission (not shown), the driving force of the electric motor 10 is transmitted to the drive wheels of the vehicle (not shown) via the transmission.

When the driving force is transmitted to the electric motor 10 from the driving wheel side during deceleration of the vehicle, the electric motor 10 functions as a generator, generating so-called regenerative braking force, and collects the kinetic energy of the vehicle as electric energy (regenerated energy). In addition, when the output shaft O of this electric motor 10 is connected to the crankshaft of an internal combustion engine (not shown) in a hybrid vehicle, for example, the electric motor 10 can function as a generator and generate electric energy when the output of the internal combustion engine is transmitted to the electric motor 10.

The inner periphery side rotor 11 and the outer periphery side rotor 12 are disposed such that the respective axes of rotation are coaxial with the output shaft O of the electric motor 10, and the permanent magnets 11a and 12a are mounted to a plurality of inner peripheral magnet mounting attachments 23 and outer peripheral magnet mounting attachments 24 respectively, provided around the peripheral direction of substantially cylindrical-shaped rotor cores 21 and 22 at predetermined intervals.

In addition, the magnet mounting attachments 23 of the inner periphery side rotor 11 and the magnet mounting attachments 24 of the outer periphery side rotor 12 are disposed to face each other in the radial direction of the rotors 11 and 12.

Thus, according to the relative positions of the inner periphery side rotor 11 and the outer periphery side rotor 12 around the output shaft O, the electric motor 10 can be set to the appropriate state, ranging from a weak magnetic field state in which the like magnetic poles of the inner peripheral permanent magnets 11a of the inner periphery side rotor 11 and the outer peripheral permanent magnets 12a of the outer periphery side rotor 12 are disposed to face each other (that is, the inner peripheral permanent magnets 11a and the outer peripheral permanent magnets 12a form a like-pole facing arrangement), to a strong magnetic field state in which the unlike magnetic poles of the inner peripheral permanent magnets 11a of the inner periphery side rotor 11 and the outer peripheral permanent magnets 12a of the outer periphery side rotor 12 are disposed to face each other (that is, the inner peripheral permanent magnets 11a and the outer peripheral permanent magnets 12a form an unlike-pole facing arrangement).

In addition, in the rotors 11 and 12, biased permanent magnet mounting attachments 31 and 32 are secured integrally to the rotors 11 and 12 at positions displaced from the rotor cores 21 and 22 in a direction parallel to the output shaft O (the axial direction), for example, and biased permanent magnets 31a and 32a are mounted to each of the biased permanent magnet mounting attachments 31 and 32, respectively.

Furthermore, the inner peripheral biased permanent magnet mounting attachments 31 and the outer peripheral biased permanent magnet mounting attachments 32 are disposed to face each other in the radial direction of the rotors 11 and 12, for example.

In addition, in the strong magnetic field state in which the unlike magnetic poles of the inner peripheral permanent magnet 11a of the inner periphery side rotor 11 and the outer peripheral permanent magnet 12a of the outer periphery side rotor 12 are disposed to face each other (that is, the inner peripheral permanent magnet 11a and the outer peripheral permanent magnet 12a form an unlike-pole facing arrangement), the inner peripheral biased permanent magnets 31a of the inner peripheral biased permanent magnet mounting attachments 31 and the outer peripheral biased permanent magnets 32a of the outer peripheral biased permanent magnet mounting attachments 32 are set such that the respective like poles face each other in the radial direction, so as to repel each other.

Furthermore, in the weak magnetic field state in which the like magnetic poles of the inner peripheral permanent magnets 11a of the inner periphery side rotor 11 and the outer peripheral permanent magnets 12a of the outer periphery side rotor 12 are disposed to face each other (that is, the inner peripheral permanent magnets 11a and the outer peripheral permanent magnets 12a are in a like-pole facing arrangement), the inner peripheral biased permanent magnets 31a of the inner peripheral biased permanent magnet mounting attachments 31 and the outer peripheral biased permanent magnets 32a of the outer peripheral biased permanent magnet mounting attachments 32 are set such that the respective unlike poles face each other in the radial direction, so as to attract each other.

Figure 2:
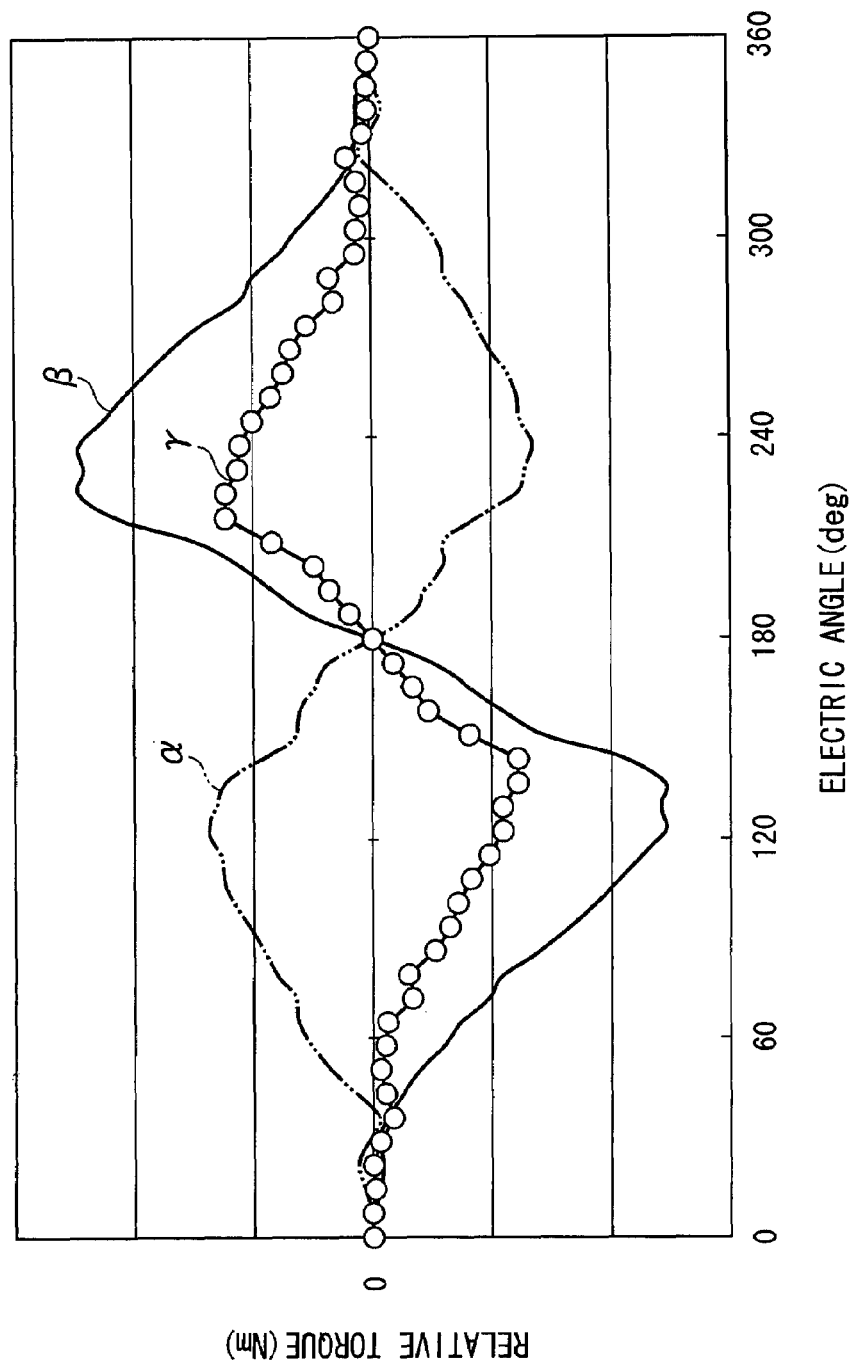
FIG. 2 is a graph showing examples of the relative torque acting between the biased permanent magnets, and the relative torque between the inner periphery side rotor and the outer periphery side rotor.

For example, as shown in FIG. 2, the relative torque a which acts between the biased permanent magnets 31a and 32a is set so as to offset the torque needed by the phase control apparatus 15 to change the relative phase between the inner periphery side rotor 11 and the outer periphery side rotor 12 (that is, the relative torque β between the inner periphery side rotor 11 and the outer periphery side rotor 12).

Accordingly, the torque required to shift the inner peripheral permanent magnet 11a and the outer peripheral permanent magnet 12a from a strong magnetic field state to a weak magnetic field state by changing the relative phase between the inner periphery side rotor 11 and the outer periphery side rotor 12 using the phase control apparatus 15, when the electric motor includes the biased permanent magnets 31a and 32a, is a composite torque γ, obtained by combining the relative torque a and the relative torque β, which is a smaller value than when the electric motor does not include the biased permanent magnets 31a and 32a.

Moreover, the biased permanent magnet mounting attachments 31 and 32 to which the biased permanent magnets 31a and 32a are mounted are positioned so that the amount of interference applied by the magnetic fluxes of the biased permanent magnets 31*a* and 32*a* to the field magnetic flux of the inner peripheral permanent magnet 11*a* and the outer peripheral permanent magnet 12*a*, which links to the stator winding 13*a* of the stator 13, is kept below a predetermined level.

Figure 3:
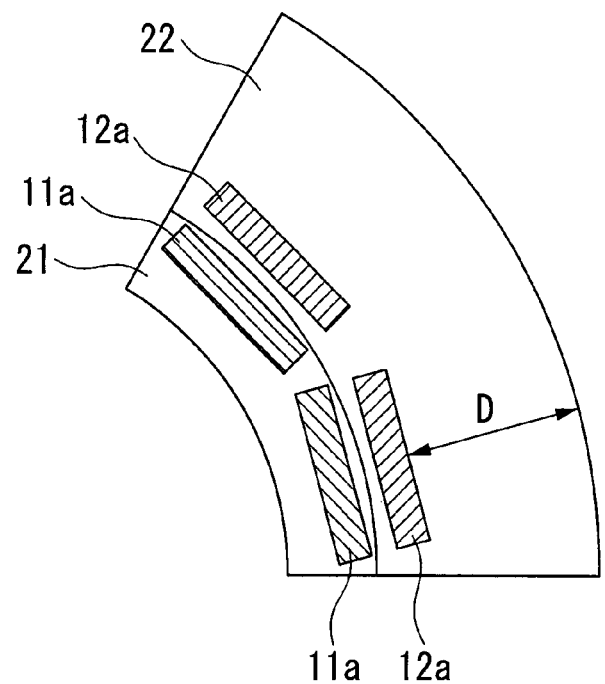
FIG. 3 is a graph showing an example of the variation in the size of the relative torque that acts between the inner periphery side rotor and the outer periphery side rotor based on a thickness D in the radial direction of the outer peripheral rotor core of the outer periphery side rotor.
Figure 3:
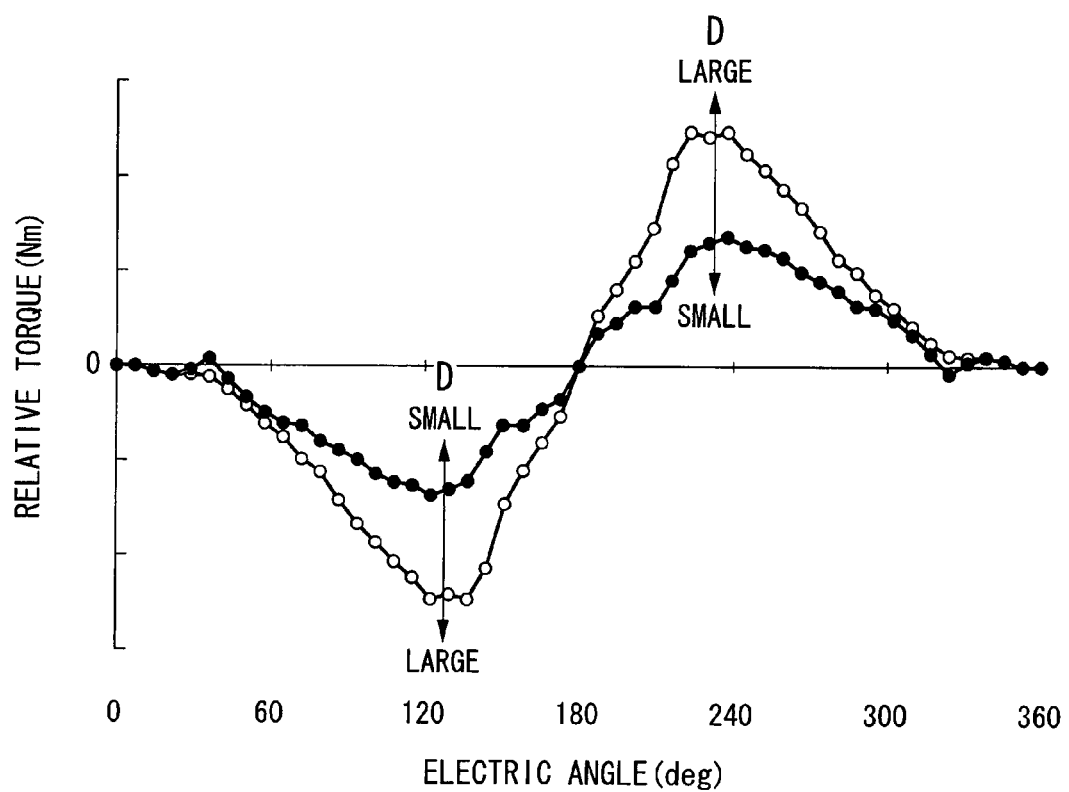

Furthermore, the size of the relative torque that acts between the inner periphery side rotor 11 and the outer periphery side rotor 12, as shown in FIG. 3 for example, varies according to the radial thickness D of the outer periphery side rotor core 22 of the outer periphery side rotor 12. For example with increasing radial thickness D, the size of the relative torque follows an increasing trend.

Moreover, the stator 13 is substantially cylindrical-shaped and disposed to face the outer peripheral section of the outer periphery side rotor 12, and is secured, for example, to a transmission housing (not shown) of a vehicle.

Furthermore, the phase control apparatus 15 is disposed, for example, in a cavity on the inner periphery of the inner periphery side rotor 11, and includes an actuator driven by electric or hydraulic power or the like which changes the relative phase between the inner periphery side rotor 11 and the outer periphery side rotor 12 by rotating either one of the inner periphery side rotor 11 or the outer periphery side rotor 12 about the output shaft O.

As described above, according to the electric motor 10 of the present invention, by providing the inner peripheral biased permanent magnets 31*a* and the outer peripheral biased permanent magnets 32*a* on the rotors 11 and 12 so that the like poles thereof face and therefore repel each other when the motor is in the strong magnetic field state where the unlike magnetic poles of the inner peripheral permanent magnet 11*a* and the outer peripheral permanent magnet 12*a* are disposed to face each other, the torque required by the phase control apparatus 15 to change the relative phase between the outer periphery side rotor 12 and the inner periphery side rotor 11 from this strong magnetic field state to the weak magnetic field state can be reduced. Accordingly, the amount of energy consumed by the phase control apparatus 15 in the process of changing the induced voltage constant of the electric motor 10 can be prevented from increasing, and the operating efficiency of the electric motor 10 can be improved, while also preventing the phase control apparatus 15 from increasing in size or requiring a more complex construction.

Figure 4:
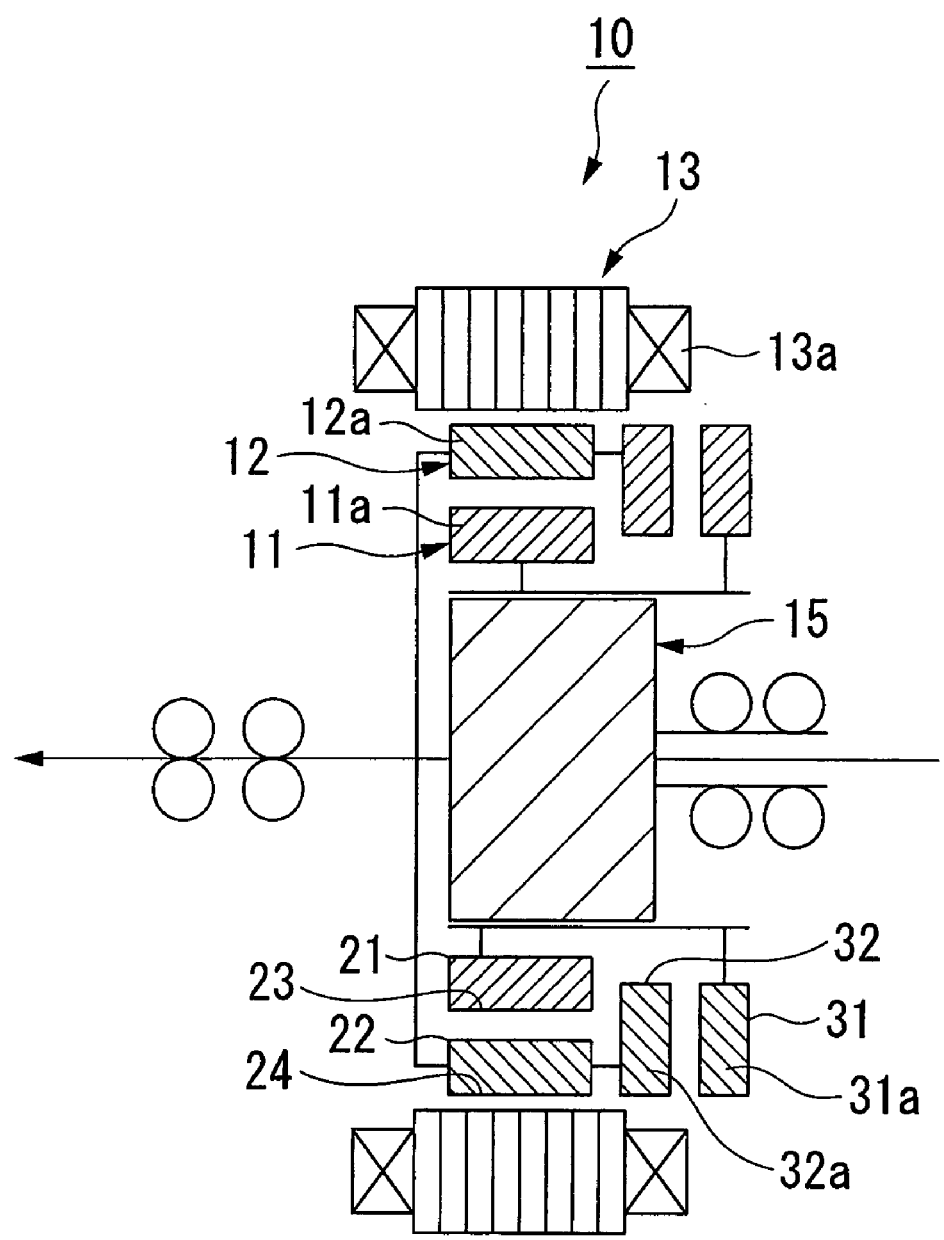
FIG. 4 is a schematic drawing showing the construction of an electric motor according to a first modified example of the embodiment.

Moreover, in the embodiment described above, the inner peripheral biased permanent magnet mounting attachments 31 and the outer peripheral biased permanent magnet mounting attachments 32 are disposed so as to face each other along the radial direction of the rotors 11 and 12, but the present invention is not limited to this configuration, and as shown in FIG. 4 for example, the biased permanent magnet mounting attachments can be disposed to face each other along the axial direction of the rotors 11 and 12.

In this first modified example, in the strong magnetic field state in which the unlike magnetic poles of the inner peripheral permanent magnets 11*a* of the inner periphery side rotor 11 and the outer peripheral permanent magnets 12*a* of the outer periphery side rotor 12 are disposed to face each other, the inner peripheral biased permanent magnets 31*a* of the inner peripheral biased permanent magnet mounting attachments 31 and the outer peripheral biased permanent magnets 32*a* of the outer peripheral biased permanent magnet mounting attachments 32 are set such that the respective like poles face each other in the axial direction, so as to repel each other.

Furthermore, in the weak magnetic field state where the like magnetic poles of the inner peripheral permanent magnet 11*a* of the inner periphery side rotor 11 and the outer peripheral permanent magnet 12*a* of the outer periphery side rotor 12 are disposed to face each other, the inner peripheral biased permanent magnets 31*a* of the inner peripheral biased permanent magnet mounting attachments 31 and the outer peripheral biased permanent magnets 32*a* of the outer peripheral biased permanent magnet mounting attachments 32 are set such that the respective unlike poles face each other in the axial direction, so as to attract each other.

Furthermore, in the strong magnetic field state in which the unlike magnetic poles of the inner peripheral permanent magnet 11*a* and the outer peripheral permanent magnet 12*a* are disposed to face each other, the inner peripheral biased permanent magnets 31*a* and the outer peripheral biased permanent magnets 32*a* can be disposed such that the respective unlike poles face each other along the direction in which the inner periphery side rotor 11 or the outer periphery side rotor 12 is rotated by the phase control apparatus 15.

As a second modified example of the embodiment, the following describes an electric motor 10 having a phase control apparatus 15 which uses hydraulic power to turn the inner periphery side rotor 11 or the outer periphery side rotor 12 about the output shaft O.

Figure 5:
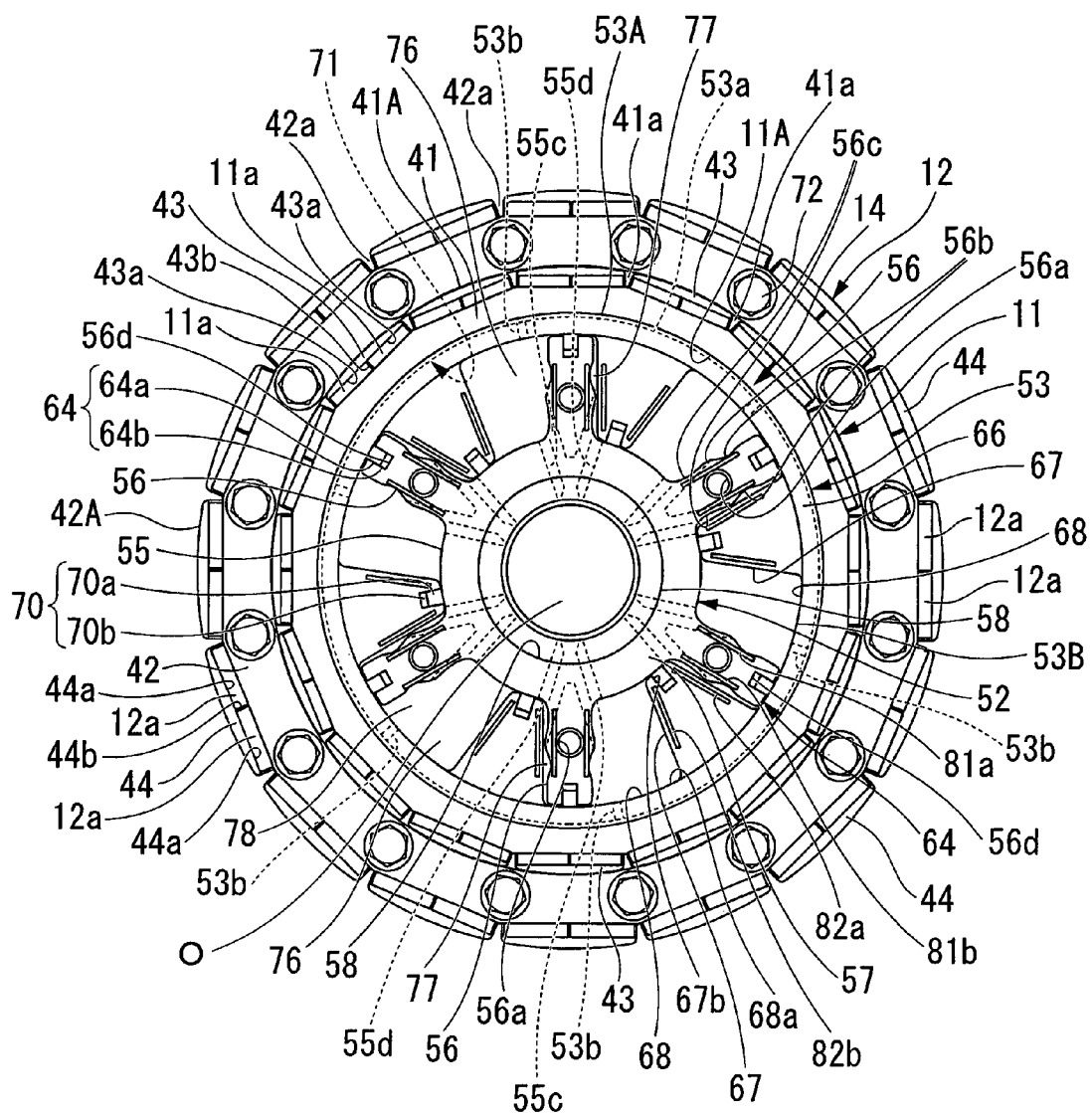
FIG. 5 is a cross sectional view of the relevant parts of an electric motor according to a second modified example of the embodiment, showing the inner periphery side rotor, the outer periphery side rotor, the stator, and the phase control device.

In an electric motor 10 according to this second modified example, the rotation axis of the inner periphery side rotor 11 is coaxial with that of the electric motor 10, and as shown in FIG. 5, the inner periphery side rotor 11 has a substantially cylindrical inner peripheral rotor core 41, around the outer periphery of which are provided a plurality of (specifically 16) inner peripheral magnet mounting attachments 43 at predetermined intervals in the circumferential direction. Furthermore, on an outer peripheral surface 41A of the inner peripheral rotor core 41, grooves 41 *a* which are recessed in the radial direction and extend parallel to the rotation axis are formed between each adjacent pair of inner peripheral magnet mounting attachments 43 in the circumferential direction. This inner peripheral rotor core 41 is formed, for example, by sintering.

The inner peripheral magnet mounting attachments 43 each has a pair of magnet attachment holes 43*a* which pass through the inner peripheral rotor core 41 in parallel to the rotation axis. The pair of magnet attachment holes 43*a* have a substantially rectangular shape when viewed in cross-section along a direction parallel to the rotation axis, and are disposed in the same plane so as to be adjacent in the circumferential direction via a center rib 43*b*. This plane is orthogonal to a radial line that joins the center rib 43*b* to the rotation axis. An inner peripheral permanent magnet 11*a*, which is substantially plate form and extends parallel to the rotation axis, is attached to each of the magnet attachment holes 43*a*.

The inner peripheral permanent magnets 11*a* attached to each of the magnet attachment holes 43*a* are all magnetized along the thickness direction (that is, the radial direction of the rotors 11 and 12) in the same manner, and both of the pair of inner peripheral permanent magnets 11*a* attached to a given pair of magnet attachment holes 43*a* formed in the same inner peripheral magnet mounting attachment 43 are magnetized in the same direction. Furthermore, for all of the inner peripheral magnet mounting attachments 43, the pair of inner peripheral permanent magnets 11*a* attached to one of an adjacent pair of inner peripheral magnet mounting attachments 43 in the circumferential direction are magnetized in the opposite direction from the magnetization direction of the pair of inner peripheral permanent magnets 11*a* attached to the other inner peripheral magnet mounting attachment 43 of the pair. In other words, an inner peripheral magnet mounting attachment 43 to which a pair of inner peripheral permanent magnets 11*a* are attached with the N pole at the outer periphery is adjacent, via a groove 41a, to an inner peripheral magnet mounting attachment 43 to which a pair of inner peripheral permanent magnets 11a are attached with the S pole at the outer periphery.

Thus, the inner periphery side rotor 11 has a plurality of inner peripheral permanent magnets 11a arranged along the circumferential direction.

The outer periphery side rotor 12 also has a rotation axis that is coaxial with that of the electric motor 10, and has a substantially cylindrical outer peripheral rotor core 42, around the outer periphery of which are provided an equivalent number of outer peripheral magnet mounting attachments 44 as there are inner peripheral magnet mounting attachments 43 at predetermined intervals in the circumferential direction. Furthermore, on an outer peripheral surface 42A of the outer peripheral rotor core 42, grooves 42a which are recessed in the radial direction and extend parallel to the rotation axis are formed between each adjacent pair of outer peripheral magnet mounting attachments 44 in the circumferential direction.

In addition, on the inner diameter side of each groove 42a in the outer peripheral rotor core 42, that is between each pair of adjacent outer peripheral magnet mounting attachments 44, bolt insertion holes are formed so as to pass through the outer peripheral rotor core 42 in the axial direction. This outer peripheral rotor core 42 is also formed, for example, by sintering.

The outer peripheral magnet mounting attachments 44 each has a pair of magnet attachment holes 44a which pass through the outer peripheral rotor core 42 in parallel to the rotation axis. The pair of magnet attachment holes 44a have a substantially rectangular shape when viewed in cross-section along a direction parallel to the rotation axis, and are disposed in the same plane so as to be adjacent in the circumferential direction via a center rib 44b. This plane is orthogonal to a radial line that joins the center rib 44b to the rotation axis. An outer peripheral permanent magnet 12a, which is substantially plate form and extends parallel to the rotation axis, is attached to each of the magnet attachment holes 44a.

The outer peripheral permanent magnets 12a attached to each of the magnet attachment holes 44a are all magnetized along the thickness direction (that is, the radial direction of the rotors 11 and 12) in the same manner, and both of the pair of outer peripheral permanent magnets 12a attached to a given pair of magnet attachment holes 44a formed in the same outer peripheral magnet mounting attachment 44 are magnetized in the same direction. Furthermore, for all of the outer peripheral magnet mounting attachments 44, the pair of outer peripheral permanent magnets 12a attached to one of an adjacent pair of outer peripheral magnet mounting attachments 44 in the circumferential direction are magnetized in the opposite direction from the magnetization direction of the pair of outer peripheral permanent magnets 12a attached to the other outer peripheral magnet mounting attachment 44 of the pair. In other words, an outer peripheral magnet mounting attachment 44 to which a pair of outer peripheral permanent magnets 12a are attached with the N pole at the outer periphery is adjacent, via a groove 42a, to an outer peripheral magnet mounting attachment 44 to which a pair of outer peripheral permanent magnets 12a are attached with the S pole at the outer periphery.

Thus, the outer periphery side rotor 12 has a plurality of outer peripheral permanent magnets 12a arranged along the circumferential direction.

Furthermore, the inner peripheral magnet mounting attachments 43 of the inner periphery side rotor 11 and the outer peripheral magnet mounting attachments 44 of the outer periphery side rotor 12 are disposed to be able to face each other along the radial direction of the rotor 11 and 12. In the facing state, the phase of every pair of inner peripheral permanent magnets 11a in the rotation direction matches the phase of the corresponding pair of outer peripheral permanent magnets 12a on a one to one basis. Furthermore, regarding the grooves 41a of the inner periphery side rotor 11 and the grooves 42a of the outer periphery side rotor 12, the phase of every groove 41a in the rotation direction matches the phase of the corresponding groove 42a on a one to one basis.

Therefore, according to the relative positions of the inner periphery side rotor 11 and the outer periphery side rotor 12 around the rotation axis, the status of the electric motor 10 can be set to the appropriate state in all of the inner peripheral permanent magnets 11a of the inner periphery side rotor 11 and all of the outer peripheral permanent magnets 12a of the outer periphery side rotor 12, ranging from the weak magnetic field state in which the magnetic poles of a given pair of inner peripheral permanent magnets 11a are disposed to face the like poles of the corresponding pair of outer peripheral permanent magnets 12a (that is, the pair of inner peripheral permanent magnets 11a and the pair of outer peripheral permanent magnets 12a form a like-pole facing arrangement) resulting in the weakest magnetic field, to the strong magnetic field state in which the magnetic poles of a given pair of inner peripheral permanent magnets 11a are disposed to face the unlike poles of the corresponding pair of outer peripheral permanent magnets 12a (that is, the pair of inner peripheral permanent magnets 11a and the pair of outer peripheral permanent magnets 12a form an unlike-pole facing arrangement) resulting in the strongest magnetic field.

The phase control apparatus 15 in this modified example includes a pair of disk-shaped drive plates (not shown) secured to both sides of the outer periphery side rotor 12 in the axial direction so as to cover the space inside the outer periphery side rotor 12, a vane rotor 52 which is provided integrally on the inside of the outer periphery side rotor 12 by being sandwiched by the drive plates, and a housing 53 which is secured integrally to the inside of the inner periphery side rotor 11 and is disposed, together with the inner periphery side rotor 11, between the vane rotor 52, the outer periphery side rotor 12, and the drive plates. The vane rotor 52 and the housing 53 are formed, for example, by sintering.

The vane rotor 52 includes a cylindrical-shaped boss 55, and a plurality of vanes 56 extending outward in the radial direction from the outer peripheral surface of the boss 55 at predetermined intervals in the circumferential direction.

On both sides of the boss 55 in the axial direction, a sandwiched base 57 which is the same length in the axial direction as the vanes 56 is formed at the outer periphery, and a step 58 which is recessed in a stepped manner further inward in the axial direction than the sandwiched base 57 is formed at the inner periphery. A connecting spline is formed substantially at the center in the axial direction of the inner diameter side of the boss 55, and passage holes 55c are formed on one side of the connecting spline in the axial direction which pass through the boss 55 from the inner periphery side of each vane 56 to the same one side in the rotation direction of the base end of the nearest vane 56, and passage holes 55d are formed on the opposite side of the connecting spline in the axial direction which pass through the boss 55 from the inner periphery side of each vane 56 to the same opposite side in the rotation direction of the base end of the nearest vane 56.

The vanes 56 have a substantially plate form, and a screw hole 56a which passes through the vane 56 in the axial direction is formed at an intermediate position of each vane 56. Furthermore, on both sides in the circumferential direction of the vane 56, a pair of concave-shaped parts 56b are formed at positions on the outer periphery side of the screw hole 56a along the entire length of the vane 56 in the axial direction, and a pair of concave-shaped parts 56c are formed at positions inward of the screw hole 56a along the entire length of the vane 56 in the axial direction. In addition, on the outer peripheral surface of each vane 56 a seal retaining groove 56d which is recessed from the outer peripheral surface of the vane 56 towards the center is formed along the entire length of the vane 56 in the axial direction. A spring seal 64 which seals the gap between the vane 56 and the housing 53 is provided in each of these seal retaining grooves 56d. Each spring seal 64 includes a seal 64a provided on the outward side in sliding contact with the housing 53, and a spring 64b provided on the inward side which pushes the seal 64a outward in the radial direction towards the housing 53.

The housing 53, which is integrally fitted to the inside of the inner periphery side rotor 11 in a predetermined phase relationship, includes a cylindrical base 66 which is thin in the radial direction, and an equivalent number of protruding sections 67 to the number of vanes 56, which protrude inward in the radial direction from the inner peripheral surface of the base 66 at predetermined intervals in the circumferential direction. Here, the entire periphery on both sides of the base 66 protrudes further in the axial direction than the protruding sections 67. Each protruding section 67 has a substantially isosceles triangle shape that converges towards the axial line, and a groove 68 capable of accommodating a vane 56 of the vane rotor 52 is formed between each pair of adjacent protruding sections 67 in the circumferential direction. On the inner end face of each protruding section 67, a seal retaining groove 67b which is recessed towards the outside diameter side is formed along the entire length in the axial direction. A spring seal 70 which seals the gap between the protruding section 67 and the outer peripheral surface of the boss 55 of the vane rotor 52 is provided in each of these seal retaining grooves 67b.

Each spring seal 70 includes a seal 70a provided on the inner periphery side in sliding contact with the boss 55 of the vane rotor 52, and a seal spring 70b provided on the outside diameter side which pushes the seal 70a towards the vane rotor 52. The housing 53 can also be integrally connected to the inner periphery side rotor 11 using a bolt or the like.

Furthermore, on an outer peripheral surface 53A of the housing 53, a spiral shaped flow passage formation groove 53a is formed which extends along the circumferential direction while shifting gradually to one side in the axial direction with increasing proximity to the front end in the extension direction. This flow passage formation groove 53a is formed from an end face 53B on one side of the housing 53 in the axial direction, and encircles the outer peripheral surface 53A of the housing 53 a number of times before ending at the end face 53B on the other side of the housing 53 in the axial direction. Furthermore, in the housing 53, at an intermediate position in the circumferential direction of a base wall 68a provided on the outside in the radial direction of each groove 68, a through hole 53b which passes through the housing 53 in the radial direction and connects to the flow passage formation groove 53a is formed. Because each through hole 53b connects to a spiral shaped flow passage formation groove 53a, each through hole is located at a different position in the axial direction of the housing 53. When the housing 53 is fitted to the inside of the inner periphery side rotor 11, the flow passage formation grooves 53a and the inner peripheral surface 11A of the inner periphery side rotor 11 together form a spiral shaped flow passage 71 which connects to the through holes 53b. This flow passage 71 is formed between the inner periphery side rotor 11 and the housing 53, having a spiral shape that extends in the circumferential direction of the housing 53, and both ends of the flow passage 71 open onto the end face 53B in the axial direction of the housing 53 of the inner periphery side rotor 11.

The inner periphery side rotor 11, which is formed integrally with the housing 53, is provided in a gap 78 located inside the outer periphery side rotor 12, outside the vane rotor 52, and between the drive plates, and is rotatably held by both axial sides of the base 66 which sits in annular grooves in the drive plates. In addition, one vane 56 of the vane rotor 52 is provided in each of the grooves 68 of the housing 53. Furthermore, the output shaft O, which is spline-connected to the vane rotor 52, is capable of rotating integrally with the outer periphery side rotor 12, the drive plates, and the vane rotor 52, and in concrete terms is secured as an integral component. Moreover, because the output shaft O is capable of rotating relative to the integrally provided outer periphery side rotor 12 and drive plates, gaps can be formed between the drive plates and the corresponding end face in the axial direction of the inner periphery side rotor 11, and a small gap is also formed between the outer peripheral surface 41A and the outer periphery side rotor 12.

In addition, vane side biased permanent magnets 81a and 81b are provided for example at both ends in the circumferential direction of each vane 56, and protrusion side biased permanent magnets 82a and 82b are provided for example at both ends in the circumferential direction of each protruding section 67, arranged such that the vane side biased permanent magnets 81a and 81b of the vane 56 and the protrusion side biased permanent magnets 82a and 82b of the protruding section 67 which are adjacent in the circumferential direction face each other along the circumferential direction.

Here, when in the strong magnetic field state in which the unlike magnetic poles of the outer peripheral permanent magnets 12a of the outer periphery side rotor 12 and the inner peripheral permanent magnets 11a of the inner periphery side rotor 11 are disposed to face each other, each of the vanes 56 contacts the adjacent protruding section 67 on the same one side in the rotation direction while positioned inside the corresponding groove 68, thereby forming a first pressure chamber 76 between the vane 56 and the protruding section 67, and a larger second pressure chamber 77 in the space between the vane 56 and the protruding section 67 on the same opposite side in the rotation direction (in other words, the first pressure chambers 76 and the second pressure chambers 77 are formed between the grooves 68 and the vanes 56 housed in those grooves). As a result, the first pressure chambers 76 and the second pressure chambers 77 are defined on the inside of the inner periphery side rotor 11.

Conversely, when in the weak magnetic field state in which the like magnetic poles of the outer peripheral permanent magnets 12a of the outer periphery side rotor 12 and the inner peripheral permanent magnets 11a of the inner periphery side rotor 11 are disposed to face each other, each of the vanes 56 contacts the adjacent protruding section 67 on the same opposite side in the rotation direction while positioned inside the corresponding groove 48, causing the second pressure chamber 77 to decrease in size, and the first pressure chamber 76 formed between the vane 56 and the adjacent protruding section 67 on the same one side in the rotation direction to increase in size. Moreover, the pressure chambers are positioned such that each one of the passage holes 55c of the vane rotor 52 always opens into one of the first pressure chambers 76, and each one of the passage holes 55d of the vane rotor 52 always opens into one of the second pressure chambers 77.

In addition, the vane side biased permanent magnets 81a and the protrusion side biased permanent magnets 82b, which oppose each other across the first pressure chamber 76, are disposed such that the unlike magnetic poles thereof face each other, that is attract each other, in the circumferential direction, and the vane side biased permanent magnets 81b and the protrusion side biased permanent magnets 82a, which oppose each other across the second pressure chamber 77, are disposed such that the like magnetic poles thereof face each other, that is repel each other, in the circumferential direction.

Accordingly, the torque required to shift the inner peripheral permanent magnets 11a and the outer peripheral permanent magnets 12a from a strong magnetic field state to a weak magnetic field state by changing the relative phase between the inner periphery side rotor 11 and the outer periphery side rotor 12 using the phase control apparatus 15 is smaller than in a case where, for example, the biased permanent magnets 81a, 81b, 82a, and 82b are not provided.

The through holes 53b formed in the housing 53 can be switched between opening onto the first pressure chamber 76 and opening onto the second pressure chamber 77 by the position of the vanes 56, and when opening onto the first pressure chamber 76, the through holes 53b connect from the first pressure chamber 76 to the outer peripheral surface 53A side of the housing 53, and a corresponding through hole 53b exists for each of the first pressure chambers 76. When opening onto the second pressure chambers 77, the through holes 53b connect from the second pressure chambers 77 to the outer peripheral surface 53A side of the housing 53, and a corresponding through hole 53b exists for each of the second pressure chambers 77.

Here, the position that produces the strong magnetic field where the unlike poles of the outer peripheral permanent magnets 12a and the inner peripheral permanent magnets 11a oppose and therefore attract each other is set as the home position for the outer periphery side rotor 12 and the inner periphery side rotor 11, at which the hydraulic fluid applies essentially no pressure to the first pressure chambers 76 and the second pressure chambers 77. Note that the first pressure chambers 76 and the second pressure chambers 77 remain filled with hydraulic fluid even when not subjected to hydraulic pressure.

Furthermore, from this home position, if hydraulic fluid is introduced into each of the first pressure chambers 76 via the passage holes 55c (that is, hydraulic pressure is introduced into the first pressure chambers 76) at the same time as hydraulic fluid is discharged from each of the second pressure chambers 77 via the passage holes 55d, the inner periphery side rotor 11 and the outer periphery side rotor 12 rotate relative to each other in opposition to the magnetic force, thereby entering the weak magnetic field state. Conversely, if hydraulic fluid is introduced into each of the second pressure chambers 77 via the passage holes 55d at the same time as hydraulic fluid is discharged from each of the first pressure chambers 76 via the passage holes 55c, the inner periphery side rotor 11 and the outer periphery side rotor 12 return to the home position and enter the strong magnetic field state, but at this time, because the outer peripheral permanent magnets 12a of the outer periphery side rotor 12 and the inner peripheral permanent magnets 11a of the inner periphery side rotor 11 are attracted to each other by magnetic force, the pressure of the hydraulic fluid introduced into the second pressure chambers 77 can be less than the pressure required to change the phase to the weak magnetic field state, and in some cases, merely introducing and discharging the hydraulic fluid is sufficient, without the need to introduce hydraulic pressure.

Here, in the electric motor 10, the direction in which the inner periphery side rotor 11 rotates relative to the outer periphery side rotor 12 when returning to the home position from the weak state in which the like poles of the outer peripheral permanent magnets 12a and inner peripheral permanent magnets 11a face each other is the same direction as the moment of inertia generated during decelerating rotation. In other words, when the vehicle is traveling forward, the electric motor 10 rotates the inner periphery side rotor 11 and the outer periphery side rotor 12 in the clockwise direction shown in FIG. 5, for example, and when the outer periphery side rotor 12 decelerates from the weak magnetic field state shown in FIG. 5, a moment of inertia occurs in the inner periphery side rotor 11 in a floating state to return to the strong magnetic field state.

Here, because the hydraulic fluid is incompressible, when changing the phase between the two limits (the strong magnetic field state and weak magnetic field state) as described above, even at intermediate positions between the ends of the two limits, the phase relationship between the inner periphery side rotor 11 and the outer periphery side rotor 12 at a specific point in time can be maintained by a hydraulic control apparatus (not shown) preventing all supply and drainage of hydraulic fluid to and from the first pressure chambers 76 and the second pressure chambers 77 by shutting a valve (not shown), which allows the change in phase to be halted at the desired magnetic field state.

Consequently, the vane rotor 52 is integrally secured to and rotates integrally with the outer periphery side rotor 12, and is disposed inward of the inner periphery side rotor 11. Furthermore, the vane rotor 52 is secured integrally to the outer periphery side rotor 12 via drive plates which are secured to the outer periphery side rotor 12 so as to cover the end faces of the outer periphery side rotor 12 and the inner periphery side rotor 11 in the axial direction, and is also integral with an output shaft 16 which outputs the driving force of the outer periphery side rotor 12.

Furthermore, the housing 53 integrally engages and rotates with the inner periphery side rotor 11, and the grooves 68 thereof together with the vane rotor 52 define the first pressure chambers 76 and the second pressure chambers 77 on the inside of the inner periphery side rotor 11. In addition, changing the relative phase of the vane rotor 52 to the housing 53 by supplying and draining hydraulic fluid to and from the first pressure chambers 76 and the second pressure chambers 77, that is by controlling the introduction of hydraulic pressure, also changes the relative phase between the inner periphery side rotor 11 and the outer periphery side rotor 12. Here, the relative phase between the inner periphery side rotor 11 and the outer periphery side rotor 12 is variable within at least 180° of the electric angle towards the advance angle side or the lag angle side, and the electric motor 10 can be set to the appropriate state ranging from the weak magnetic field state in which the like poles of the inner peripheral permanent magnets 11a of the inner periphery side rotor 11 and the outer peripheral permanent magnets 12a of the outer periphery side rotor 12 are disposed to face each other, and the strong magnetic field state in which the unlike poles of the inner peripheral permanent magnets 11a of the inner periphery side rotor 11 and the outer peripheral permanent magnets 12a of the outer periphery side rotor 12 are disposed to face each other.

In addition, in the gaps 78 formed between the outer periphery side rotor 12, the vane rotor 52, and the drive plates enclosed as a result of securing the drive plates which transmit the driving force from the outer periphery side rotor 12 to the output shaft 16 respectively to the end faces of the outer periphery side rotor 12 and vane rotor 52 in the axial direction, the integral inner periphery side rotor 11 and the housing 53 are provided so as to rotate in the circumferential direction. The integrated product consisting of the inner periphery side rotor 11 and the housing 53 is provided inside this gap 78 in a floating state which allows free rotation (that is, the integrated product is not secured to the drive plates and the output shaft O).

The first embodiment described above can be summarized as follows.

(1) An electric motor according to a first aspect of the invention has an inner periphery side rotor (for example the inner periphery side rotor 11 in the present embodiment) having inner peripheral permanent magnets (for example the inner peripheral permanent magnets 11a in the present embodiment) provided along the circumferential direction and an outer periphery side rotor (for example the outer periphery side rotor 12 in the present embodiment) having outer peripheral permanent magnets (for example the outer peripheral permanent magnets 12a in the present embodiment) provided along the circumferential direction, both side rotors having the same axis of rotation, and includes a rotating device (for example the phase control apparatus 15 in the present embodiment) capable of changing the relative phase between the inner periphery side rotor and the outer periphery side rotor by rotating at least one of the rotors about the axis of rotation, and also includes first permanent magnets (for example the outer peripheral biased permanent magnets 32a and the vane side biased permanent magnets 81a and 81b in the present embodiment) secured integrally to the outer periphery side rotor, and second permanent magnets (for example the inner peripheral biased permanent magnets 31a and the protrusion side biased permanent magnets 82a and 82b of the present embodiment) secured integrally to the inner periphery side rotor, disposed such that when the unlike poles of the inner peripheral permanent magnets and the outer peripheral permanent magnets face each other, the like poles of the first permanent magnets and the second permanent magnets face each other.

With the electric motor according to the first aspect, by changing the relative phase between the outer periphery side rotor and the inner periphery side rotor using the rotating device, the magnetic flux linkage of the field magnet flux of the outer peripheral permanent magnets to the stator windings can be efficiently increased or decreased by the field magnet flux of the inner peripheral permanent magnets. Furthermore, in the strong magnetic field state, for example, the torque constant of the electric motor (namely torque divided by phase current) can be set to a relatively high value, and the maximum torque output by the electric motor can be increased without reducing the current loss while the motor is operating or changing the maximum output current of the inverter that controls the application of current to the stator windings, thereby increasing the maximum operating efficiency of the electric motor.

Furthermore, by providing the first permanent magnets and the second permanent magnets on the outer periphery side rotor and the inner periphery side rotor, respectively, so that the like poles thereof face and therefore repel each other when the motor is in the strong magnetic field state in which the unlike poles of the inner peripheral permanent magnets and the outer peripheral permanent magnets are disposed to face each other, the torque required by the rotating device to change the relative phase between the outer periphery side rotor and the inner periphery side rotor from this strong magnetic field state to the weak magnetic field state can be reduced. Accordingly, an increase in the energy consumption of the rotating device when changing the induced voltage constant of the electric motor can be prevented, thereby improving the operating efficiency of the electric motor, while also preventing the rotating device from increasing in size or requiring a more complex construction.

(2) An electric motor according to a second aspect of the invention has an inner periphery side rotor (for example the inner periphery side rotor 11 in the present embodiment) having inner peripheral permanent magnets (for example the inner peripheral permanent magnets 11a in the present embodiment) provided along the circumferential direction and an outer periphery side rotor (for example the outer periphery side rotor 12 in the present embodiment) having outer peripheral permanent magnets (for example the outer peripheral permanent magnets 12a in the present embodiment) provided along the circumferential direction, which have the same axis of rotation, and includes a rotating device (for example the phase control apparatus 15 in the present embodiment) capable of changing the relative phase between the inner periphery side rotor and the outer periphery side rotor by rotating at least one of the rotors about the axis of rotation, and also includes first permanent magnets (for example the outer peripheral biased permanent magnets 32a and the vane side biased permanent magnets 81a and 81b in the present embodiment) which are secured integrally to the outer periphery side rotor, and second permanent magnets (for example the inner peripheral biased permanent magnets 31a and the protrusion side biased permanent magnets 82a and 82b of the present embodiment) which are secured integrally to the inner periphery side rotor, disposed such that when the unlike poles of the inner peripheral permanent magnets and the outer peripheral permanent magnets face each other, the unlike poles of the first permanent magnets and the second permanent magnets face each other in a direction following the direction of rotation of the rotating device.

With the electric motor according to the second aspect, by changing the relative phase between the outer periphery side rotor and the inner periphery side rotor using the rotating device, the magnetic flux linkage of the field magnet flux of the outer peripheral permanent magnets to the stator windings can be efficiently increased or decreased by the field magnet flux of the inner peripheral permanent magnets. Furthermore, in the strong magnetic field state, for example, the torque constant of the electric motor (namely torque divided by phase current) can be set to a relatively high value, and the maximum torque output by the electric motor can be increased without reducing the current loss while the motor is operating or changing the maximum output current of the inverter that controls the application of current to the stator windings, thereby increasing the maximum operating efficiency of the electric motor.

Furthermore, by providing the first permanent magnets and the second permanent magnets on the outer periphery side rotor and the inner periphery side rotor, respectively, so that the unlike poles thereof face and therefore attract each other in a direction following the direction of rotation of the rotating device when the motor is in the strong magnetic field state in which the unlike poles of the of the inner peripheral permanent magnets and the outer peripheral permanent magnets face each other, the torque required by the rotating device to change the relative phase between the outer periphery side rotor and the inner periphery side rotor from this strong magnetic field state to the weak magnetic field state can be reduced. Accordingly, an increase in the energy consumption of the rotating device when changing the induced voltage constant of the electric motor can be prevented, thereby improving the operating efficiency of the electric motor, while also preventing the rotating device from increasing in size or requiring a more complex construction.

As described above, with the electric motors described in the first and second aspects, an increase in the energy consumption of the rotating device when changing the induced voltage constant of the electric motor can be prevented, thereby improving the operating efficiency of the electric motor, while also preventing the rotating device from increasing in size or taking on a more complex construction.

(3) A third aspect of the invention is an electric motor according to the first or second aspects, in which the first permanent magnets and the second permanent magnets are disposed to face each other in the radial direction of the outer periphery side rotor and the inner periphery side rotor.

In this case, in the strong magnetic field state of the outer peripheral permanent magnets and the inner peripheral permanent magnets, when the like magnetic poles of the radially opposed first permanent magnets and second permanent magnets are disposed to face each other, or a number of pairs of first permanent magnets and second permanent magnets which are radially opposed are arranged along the circumferential direction, by arranging the first permanent magnets and the second permanent magnets so that the unlike poles thereof are adjacent in a direction substantially following the direction of rotation of the rotating device, the torque required by the rotating device to change the relative phase between the outer periphery side rotor and the inner periphery side rotor from this strong magnetic field state to the weak magnetic field state can be reduced.

(4) A fourth aspect of the invention is an electric motor according to the first or second aspects, in which the first permanent magnets and the second permanent magnets are disposed to face each other in the axial direction of the outer periphery side rotor and the inner periphery side rotor.

In this case, in the strong magnetic field state of the outer peripheral permanent magnets and the inner peripheral permanent magnets, when the like magnetic poles of the axially opposed first permanent magnets and second permanent magnets are disposed to face each other, or a number of pairs of first permanent magnets and second permanent magnets which are axially opposed are arranged along the circumferential direction, by arranging the first permanent magnets and the second permanent magnets so that the unlike poles thereof are adjacent in a direction substantially following the direction of rotation of the rotating device, the amount of torque required by the rotating device to change the relative phase between the outer periphery side rotor and the inner periphery side rotor from this strong magnetic field state to the weak magnetic field state can be reduced.

As described above, with the electric motors described in the third and fourth aspects, the forces of repulsion and attraction between the first and second permanent magnets allow the amount of torque used by the rotating device to change the relative phase between the outer periphery side rotor and the inner periphery side rotor from the strong magnetic field state to the weak magnetic field state to be reduced.

(5) A fifth aspect of the invention is an electric motor according to the first or second aspects, in which the rotating device includes a first member (for example the vane rotor 52 in the embodiment) which is capable of rotating integrally with the outer periphery side rotor, and a second member (for example the housing 53 in the embodiment) which is capable of rotating integrally with the inner periphery side rotor and together with the first member forms pressure chambers (for example the first pressure chamber 76 and the second pressure chambers 77 in the embodiment) on the inside of the inner periphery side rotor, wherein the relative phase between the outer periphery side rotor and the inner periphery side rotor can be changed by supplying working fluid to the pressure chambers, and the first member includes the first permanent magnets and the second member includes the second permanent magnets.

In this case, because the rotating device can change the relative phase between the outer periphery side rotor and the inner periphery side rotor by supplying working fluid to the pressure chambers formed on the inside of the inner periphery side rotor by the first member capable of rotating integrally with the outer periphery side rotor and the second member capable of rotating integrally with the inner periphery side rotor, by disposing the first permanent magnets of the first member and the second permanent magnets of the second member such that the like poles thereof face each other, or the unlike poles thereof are adjacent in a direction substantially along the direction of rotation of the rotating device, when the inner peripheral permanent magnets and the outer peripheral permanent magnets are in the strong magnetic field state, the torque required by the rotating device to change the relative phase between the outer periphery side rotor and the inner periphery side rotor from the strong magnetic field state to the weak magnetic field state can be reduced.

As a result, with the electric motor according to this aspect, the forces of repulsion and attraction between the first and second permanent magnets in the first member and the second member forming the pressure chambers allow for a reduction in the torque required by the rotating device, which sets the relative phase between the inner periphery side rotor and the outer periphery side rotor to the desired phase by controlling the amount of working fluid supplied to the pressure chambers, to change the relative phase between the outer periphery side rotor and the inner periphery side rotor from this strong magnetic field state to the weak magnetic field state.

(6) A sixth aspect of the invention is an electric motor according to any one of the first to fifth aspects, in which the first permanent magnets and the second permanent magnets are disposed in a position such that the amount of interference applied by the magnetic fluxes of the first permanent magnets and second permanent magnets to the field magnetic flux of the inner peripheral permanent magnets and outer peripheral permanent magnets which link to the stator windings is kept below a predetermined level.

In this case, by setting up the motor so that the amount of interference the magnetic fluxes of the first and second permanent magnets apply to the field magnetic flux of the inner peripheral permanent magnets and outer peripheral permanent magnets which link to the stator windings is below a predetermined level, narrowing of the operable RPM range and torque range of the electric motor can be prevented, and the desired running performance can be ensured.

DESCRIPTION OF THE REFERENCE NUMERALS

10 Electric motor
11 Inner periphery side rotor
11a Inner peripheral permanent magnet
12 Outer periphery side rotor
12a Outer peripheral permanent magnet
15 Phase control apparatus (rotating device)
31a Inner peripheral biased permanent magnets (second permanent magnets)
32a Outer peripheral biased permanent magnets (first permanent magnets)

52 Vane rotor (first member)
53 Housing (second member)
76 First pressure chamber (pressure chamber)
77 Second pressure chamber (pressure chamber)
81a, 81b Vane side biased permanent magnets (first permanent magnets)
82b, 82a Protrusion side biased permanent magnets (second permanent magnets)

EMBODIMENT 2

A second embodiment of the present invention is described below with reference to FIG. 6 to FIG. 10.

Figure 6:
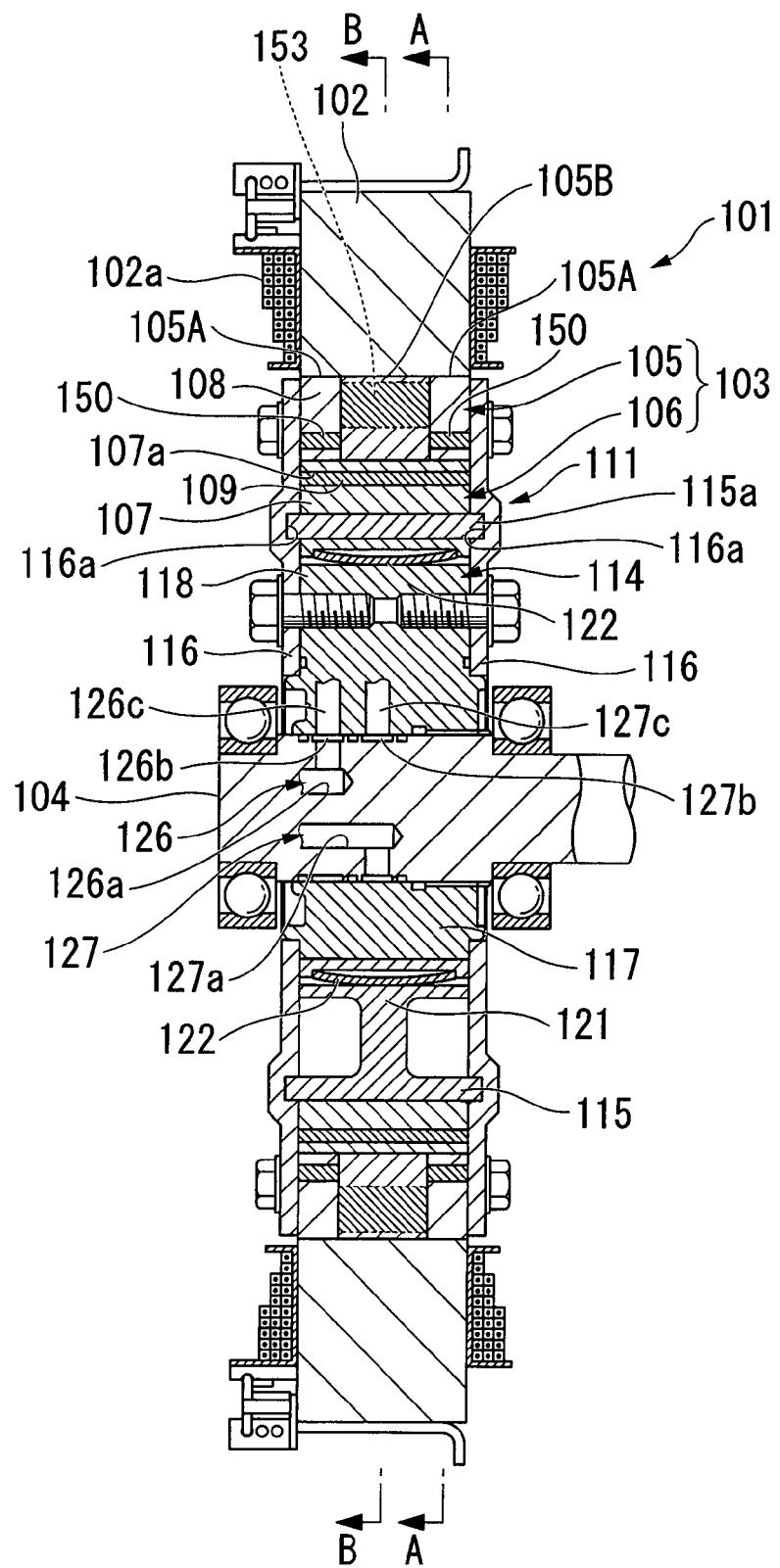
FIG. 6 is a cross sectional view of the relevant parts of an electric motor according to a second embodiment of the present invention.

An electric motor 101 of the present embodiment, as shown in FIG. 6 for example, is an inner rotor brushless motor including a rotor unit 103 disposed on the inner periphery side of an annular rotor 102, for use as the traveling drive source in a hybrid or electric vehicle. The rotor 102 includes a multiphase stator winding 102a, and the rotor unit 103 includes a rotary shaft 104 at its axial center. When used as the traveling drive source for a vehicle, the torque of the electric motor 101 is transmitted to the drive wheels (not shown) via the transmission (not shown). In this case, if the electric motor 101 functions as a generator during deceleration of the vehicle, the energy can be stored in a capacitor as regenerated energy. Furthermore, in a hybrid vehicle, by further linking the rotary shaft 104 of the electric motor 101 to the crankshaft (not shown) of the internal combustion engine, the electric motor can be used to generate energy based on internal combustion.

As shown in FIG. 6 to FIG. 9, the rotor unit 103 includes an annular outer periphery side rotor 105, and an annular inner periphery side rotor 106 provided concentrically inside the outer periphery side rotor 105, wherein the outer periphery side rotor 105 and the inner periphery side rotor 106 can be rotated within the setting angle range.

An annular rotor core 107 which serves as the main rotor body is formed in the inner periphery side rotor 106, and a plurality of magnet attachment slots 107a are formed at equal intervals around the circumferential direction at positions nearer the outer periphery of the rotor core 107. An opening which is rectangular along the tangential direction of the rotor core 107 is formed in each magnet attachment slot 107a, substantially in parallel with the axis of the rotor core 107, and these rectangular openings extend from one end in the axial direction of the rotor core 107 to the other. A flat permanent magnet 109 (referred to as an inner peripheral permanent magnet 109 below) which is magnetized in the thickness direction is attached to each of these magnet attachment slots 107a.

Here, when attached to the magnet attachment slots 107a, each of the inner peripheral permanent magnets 109 is magnetized in the radial direction of the inner periphery side rotor 106, and the magnetic poles of adjacent permanent magnets in the circumferential direction (for example the magnetic poles on the outside in the radial direction) are unlike poles. In other words, the inner peripheral permanent magnets 109 are disposed so as to present a pattern of alternating poles around the circumferential direction of the inner periphery side rotor 106. Furthermore, in the outer peripheral surface of the inner periphery side rotor 106, notches 110 which control the flow of the magnetic flux are formed between adjacent magnet attachment slots 107a in the circumferential direction.

On the other hand, in the outer periphery side rotor 105, an annular rotor core 108 which serves as the main rotor body is formed in the same manner as in the inner periphery side rotor 106. As shown in FIG. 6, this outer periphery side rotor 105 consists of first rotor layers 105A on both sides in the axial direction sandwiching a second rotor layer 105B which has a different cross sectional structure.

Figure 7:
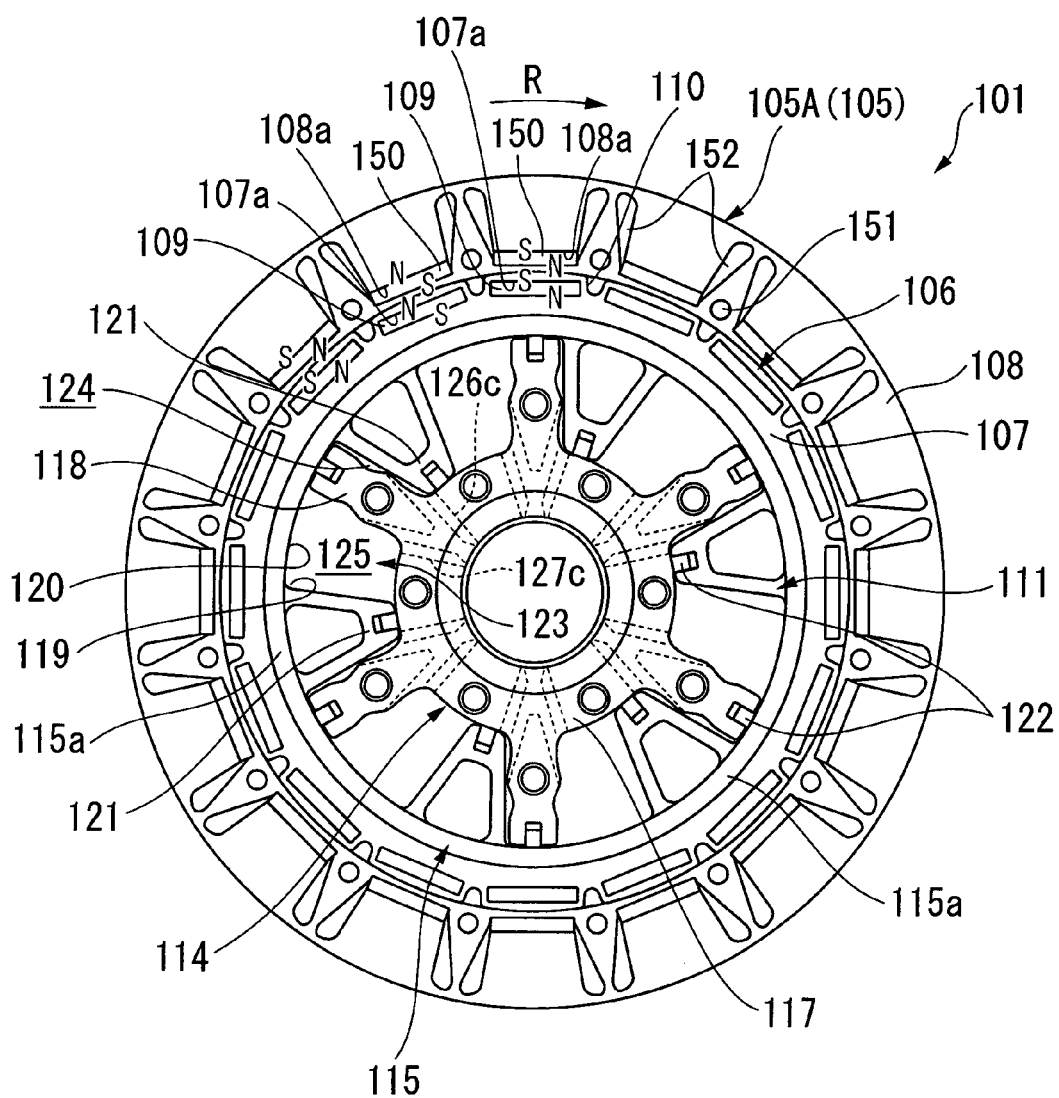
FIG. 7 is a side view of a rotor unit of the same embodiment, showing the outer periphery side rotor along the line A-A in FIG. 6.

As shown in FIG. 7, a plurality of magnet attachment slots 108a are formed at equal intervals around the circumferential direction of the first rotor layer 105A near the inner periphery side of the rotor core 108. Each magnet attachment slot 108a has a rectangular opening formed along the tangential direction of the rotor core 108 in parallel with the axis of the outer periphery side rotor 105, which extends from one end in the axial direction of the first rotor layer 105A to the other. A flat permanent magnet 150 (referred to as an outer peripheral permanent magnet 150 below) which is magnetized in the thickness direction is attached to each of these magnet attachment slots 108a. These outer peripheral permanent magnets 150, in the same manner as the inner peripheral permanent magnets 109 of the inner periphery side rotor 106, are magnetized in the radial direction when attached to the magnet attachment slots 108a, and the magnetic poles of adjacent permanent magnets are unlike poles. In other words, the outer peripheral permanent magnets 150 are disposed so as to present a pattern of alternating poles around the circumferential direction of the first rotor layer 105A.

In FIG. 7, reference numeral 151 indicates bolt fastening holes formed between adjacent magnet attachment slots 108a on the rotor core 108, which are used to connect drive plates 116, described below, to the outer periphery side rotor 105 through these bolt fastening holes 151. Furthermore, reference numeral 152 in FIG. 7 indicates magnetic flux blocking holes which extend outward in the radial direction from each end of the magnet attachment slots 108a in the rotor core 108 of the first rotor layer 105A.

Figure 8:
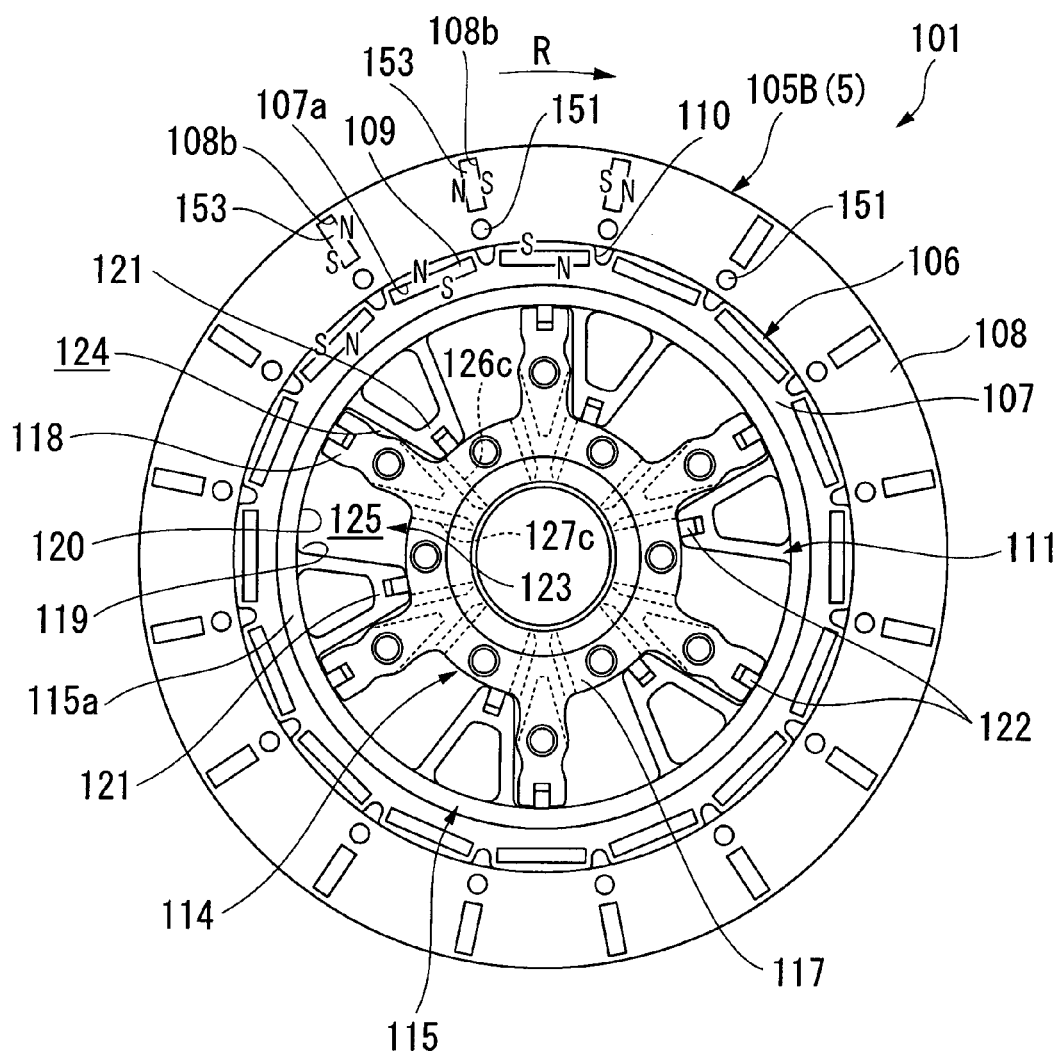
FIG. 8 is a side view of the rotor unit of the same embodiment, showing the outer periphery side rotor along the line B-B in FIG. 6.
Figure 9:
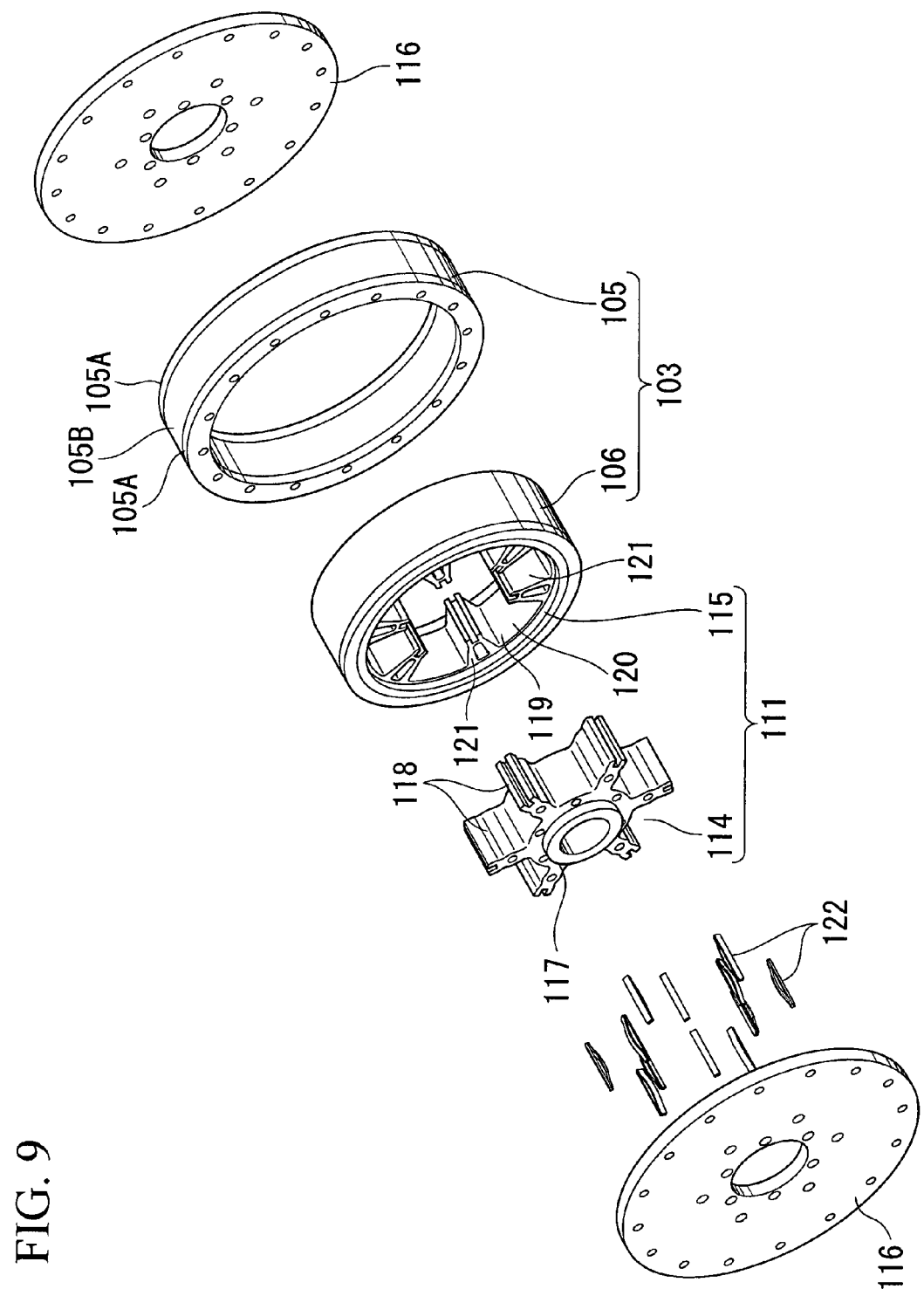
FIG. 9 is an exploded perspective view showing the rotor unit of the same embodiment.

Furthermore, as shown in FIG. 8, a plurality of magnet attachment slots 108b are formed at equal intervals around the circumferential direction of the rotor core 108 in the second rotor layer 105B. Each magnet attachment slot 108b has an opening which is rectangular along the radial direction of the rotor core 108 and extends from one end of the second rotor layer 105B in the axial direction to the other. A flat permanent magnet 153 (referred to as an outer peripheral permanent magnet 153 below), which is magnetized in the thickness direction, is attached to each magnet attachment slot 108b. These outer peripheral permanent magnets 153 are magnetized in substantially the circumferential direction (more accurately, the tangential direction of a circle centered on the center of the axis of the outer periphery side rotor 105) when attached to the magnet attachment slots 108b, and each magnetic pole faces the like pole of the adjacent permanent magnet in the circumferential direction. In other words, in the second rotor layer 105B, the outer peripheral permanent magnets 153 are disposed to form an alternating pattern of facing N poles and facing S poles along the circumferential direction.

The first rotor layers 105A and second rotor layer 105B with the above construction are coupled in such a manner that each outer peripheral permanent magnet 153 on the second rotor layer 105B side is positioned between a pair of adjacent outer peripheral permanent magnets 150 on the first rotor layer 105A side. Furthermore, the magnetic poles of the outer peripheral permanent magnets 150 and 153 of the rotor layers 105A and 105B, when viewed superposed along the axial direction, are such that each outer peripheral permanent magnet 150 on the first rotor layer 105A side which is positioned between a pair of adjacent outer peripheral permanent magnets 153 (referred to as adjacent magnets 153) on the second rotor layer 105B side has the same magnetic pole as the adjacent magnets 153 it faces. In other words, the outer peripheral permanent magnets 150 of the first rotor layer 105A are arranged so that, for example, an outer peripheral permanent magnet 150 having an N pole on the outside in the radial direction is positioned between a pair of outer peripheral permanent magnets 153 on the second rotor layer 105B whose N poles face each other, and an outer peripheral permanent magnet 150 having an S pole on the outside in the radial direction is positioned between a pair of outer peripheral permanent magnets 153 on the second rotor layer 105B whose S poles face each other.

Incidentally, the number of inner peripheral permanent magnets 109 of the inner periphery side rotor 106 is equivalent to the number of outer peripheral permanent magnets 150 of the first rotor layer 105A, so that a one-to-one correspondence is achieved between the inner peripheral permanent magnets 109 and the outer peripheral permanent magnets 150. Consequently, by using an arrangement in which unlike poles of the inner peripheral permanent magnets 109 of the inner periphery side rotor 106 and permanent magnets 150 of the first rotor layer 105A face each other (an unlike-pole facing arrangement), a strong magnetic field state can be obtained in which the magnetic field between the inner periphery side rotor 106 and the first rotor layer 106A is strongest, and by using an arrangement in which the like poles of the inner peripheral permanent magnets 109 of the inner periphery side rotor 106 and outer peripheral permanent magnets 150 of the first rotor layer 105A face each other (a like-pole facing arrangement), a weak magnetic field state can be obtained in which the magnetic field between the inner periphery side rotor 106 and the first rotor layer 105A is weakest.

Furthermore, the number of inner peripheral permanent magnets 109 of the inner periphery side rotor 106 is equivalent to the number of areas between adjacent outer peripheral permanent magnets 153 (referred to as areas between like poles) on the second rotor layer 105B, so that one-to-one correspondence is achieved between the inner peripheral permanent magnets 109 and the areas between like poles on the second rotor layer 105B side. Consequently, by using an arrangement in which the magnetic poles of the inner peripheral permanent magnets 109 of the inner periphery side rotor 106 and the areas between like poles on the second rotor layer 105B side are unlike poles, a weak magnetic field state can be obtained in which the magnetic field between the inner periphery side rotor 106 and the second rotor layer 105B is weakest, and by using an arrangement in which the magnetic poles of the inner peripheral permanent magnets 109 of the inner periphery side rotor 106 and the areas between like poles on the second rotor layer 105B side are like poles, a strong magnetic field state can be obtained in which the magnetic field between the inner periphery side rotor 106 and the second rotor layer 105B is strongest due to the so-called Halbach effect.

Furthermore, by using this magnet arrangement in the first rotor layers 105A and second rotor layer 105B in the rotor unit 103, when the inner periphery side rotor 106 and the first rotor layer 106A are in the strong magnetic field state, the strong magnetic field state also occurs between the inner periphery side rotor 106 and the second rotor layer 105B, and when the inner periphery side rotor 106 and the first rotor layer 106A are in the weak magnetic field state, the weak magnetic field state also occurs between the inner periphery side rotor 106 and the second rotor layer 105B.

However, when the inner periphery side rotor 106 and the first rotor layer 105A are in the strong magnetic field state, because the unlike magnetic poles of the inner peripheral permanent magnets 109 and outer peripheral permanent magnets 150 face each other, the attraction force of the inner peripheral permanent magnets 109 and the outer peripheral permanent magnets 150 acts on the inner periphery side rotor 106 and the first rotor layer 105A in the direction of rotation, and when the inner periphery side rotor 106 and the second rotor layer 105B are in the weak magnetic field state, because the like magnetic poles of the inner peripheral permanent magnets 109 and outer peripheral permanent magnet 153 face each other, the repulsion force of the inner peripheral permanent magnets 109 and the outer peripheral permanent magnet 153 acts on the inner periphery side rotor 106 and the second rotor layer 105B in the direction of rotation. Furthermore, conversely, when the weak magnetic field state exists between the inner periphery side rotor 106 and both the rotor layers 105A and 105B, because the like magnetic poles of the inner peripheral permanent magnets 109 and the outer peripheral permanent magnet 150 face each other and the unlike magnetic poles of the inner peripheral permanent magnets 109 and the outer peripheral permanent magnets 153 face each other, the repulsion force of the inner peripheral permanent magnets 109 and the outer peripheral permanent magnets 150 acts between the inner periphery side rotor 106 and the first rotor layer 105A in the direction of rotation, and the attraction force of the inner peripheral permanent magnets 109 and the outer peripheral permanent magnets 153 acts between the inner periphery side rotor 106 and the second rotor layer 105B in the direction of rotation.

Furthermore, the rotor unit 103 includes a rotating mechanism 111 (phase changing device) which rotates the outer periphery side rotor 105 and the inner periphery side rotor 106 relative to each other. This rotating mechanism 111 operates based on pressure applied by a hydraulic fluid, which serves as an incompressible working fluid.

The rotating mechanism 111, as shown in FIG. 6 to FIG. 9, includes a vane rotor 114 which is spline-connected to the outer periphery of the rotary shaft 104 in a integrally rotatable manner, and an annular housing 115 which is disposed on the outer periphery of the vane rotor 114 and can rotate relative to the vane rotor 114, wherein the annular housing 115 is integrally engaged and secured to the inner peripheral surface of the inner periphery side rotor 106, and the vane rotor 114 is integrally joined to the outer periphery side rotor 105 via a pair of disk shaped drive plates 116 which sandwich the annular housing 115 and the inner periphery side rotor 106 from both sides. Accordingly, the vane rotor 114 is integrated with the rotary shaft 104 and the outer periphery side rotor 105, and the annular housing 115 is integrated with the inner periphery side rotor 106.

In the vane rotor 114, a plurality of vanes 118 which protrude outward in the radial direction are provided at equal intervals around the circumferential direction of the outer periphery of a cylindrical boss 117 which is spline-connected to the rotary shaft 104. On the other hand, in the annular housing 115, a plurality of grooves 119 are provided on the inner peripheral surface at equal intervals in the circumferential direction, with each groove 119 being disposed so as to accommodate the corresponding vane 118 of the vane rotor 114. Each groove 119 consists of a circular arc shaped base wall 120 which substantially matches the trajectory of the front end of the vane 118, and a substantially triangular dividing wall 121 which delineates between adjacent grooves 119, such that when the vane rotor 114 and the annular housing 115 rotate relative to each other, the vane 118 can move between the dividing wall 121 on one side of the groove 119 and the dividing wall 121 on the other side. In the present embodiment, the dividing wall 121 also functions as a stopper, which by coming into contact with the vane 118 restricts the relative rotation of the vane rotor 114 and the annular housing 115. Moreover, a sealing member 122 which extends along the axial direction is provided at the front end of each vane 118 and each dividing wall 121, and these sealing members 122 provide a liquid-tight seal between the outer peripheral surfaces of the vane 118, the base wall 120 and dividing wall 121 of the groove 119, and the boss 117.

Furthermore, a base section 115a of the annular housing 115 secured to the inner periphery side rotor 106 has as a cylindrical shape with a constant thickness, and protrudes further outward in the axial direction than the inner periphery side rotor 106 and the dividing wall 121, as shown in FIG. 6. These outwardly protruding ends of the base section 115a are held in a sliding manner in annular guide grooves 116a formed in the drive plates 116, so that the annular housing 115 and the inner periphery side rotor 106 are supported by the outer periphery side rotor 105 and the rotary shaft 104 in a floating state.

The drive plates 116 on both sides which connect the outer periphery side rotor 105 to the vane rotor 114 are in intimate sliding contact with both side faces (both end faces in the axial direction) of the annular housing 115, so as to occlude the sides of the grooves 119 of the annular housing 115. Accordingly, each groove 119 forms an independent space enclosed by the boss 117 of the vane rotor 114 and the drive plates 116 on both sides, which is used as a supply space 123 for the supply of hydraulic fluid. The interior of each supply space 123 is divided into two chambers by the corresponding vane 118 of the vane rotor 114, with one of these chambers being an advance angle side working chamber 124 and the other chamber being a lag angle side working chamber 125. When hydraulic fluid is introduced into the advance angle side working chamber 124, the hydraulic pressure causes the inner periphery side rotor 106 to rotate in the advance angle direction relative to the outer periphery side rotor 105, and when hydraulic fluid is introduced into the lag angle side working chamber 125, the hydraulic pressure causes the inner periphery side rotor 106 to rotate in the lag angle direction relative to the outer periphery side rotor 105. In this case, the "advance angle" refers to advancing the inner periphery side rotor 106 relative to the outer periphery side rotor 105 in the rotation direction of the electric motor 101 indicated by the arrow labeled R in FIG. 7 and FIG. 8, and the "lag angle" refers to advancing the inner periphery side rotor 106 relative to the outer periphery side rotor 105 in the opposite direction to the rotation direction R of the electric motor 101.

Furthermore, the supply and drainage of hydraulic fluid to and from the advance angle side working chamber 124 and the lag angle side working chamber 125 is performed through the rotary shaft 104. Specifically, the advance angle side working chamber 124 is connected to an advance angle side supply/drainage passage 126 of the hydraulic control apparatus, and the lag angle side working chamber 125 is connected to a lag angle side supply/drainage passage 127 of the same hydraulic control apparatus, and as shown in FIG. 6, parts of the advance angle side supply/drainage passage 126 and the lag angle side supply/drainage passage 127 are composed of passage holes 126a and 127a, respectively, formed along the axial direction of the rotary shaft 104. Furthermore, the ends of the passage holes 126a and 127a connect to an annular groove 126b and an annular groove 127b, respectively, which are formed on the outer peripheral surface of the rotary shaft 104 at two locations offset in the axial direction, and these annular grooves 126b and 127b are connected to a plurality of through holes 126c and 127c formed substantially along the radial direction of the boss 117 of the vane rotor 114. The through holes 126c of the advance angle side supply/drainage passage 126 connect the annular groove 126b to the advance angle side working chamber 124, and the through holes 127c of the lag angle side supply/drainage passage 127 connect the annular groove 127b to the lag angle side working chamber 125.

Although this electric motor 101 can change between a weak magnetic field state and a strong magnetic field state as desired by controlling the supply and drainage of hydraulic fluid to and from the advance angle side working chamber 124 and the lag angle side working chamber 125, when the strength of the magnetic field is changed in this manner, the induced voltage constant varies accordingly, which changes the characteristics of the electric motor 101. In other words, in the strong magnetic field state in which the induced voltage constant is large, the operable RPM range of the electric motor 101 decreases, but the maximum output torque increases, and conversely, in the weak magnetic field state in which the induced voltage constant is small, the maximum torque the electric motor 101 can output decreases, but the operable RPM range increases.

As described above, in the electric motor 101 of the present embodiment, because the rotating mechanism 111 which changes the phase angle between the inner periphery side rotor 106 and the outer periphery side rotor 105 is operated by hydraulic pressure, the phase angle between the rotors 106 and 105 can be changed quickly and freely with arbitrary timing.

Furthermore, in this electric motor 101, because the magnetic field state of the inner periphery side rotor 106 is set to match that of the rotor layers 106A and 105B of the outer periphery side rotor 105, a large variable ratio can be secured when rotating the inner periphery side rotor 106 and the outer periphery side rotor 105 relative to each other. Furthermore, in the strong magnetic field state, the so-called Halbach effect from the inner peripheral permanent magnets 109 and the outer peripheral permanent magnets 153 allows a large induced voltage constant to be secured between the inner periphery side rotor 106 and the second rotor layer 105B, which allows the output torque of the electric motor 101 to be easily increased.

Furthermore, because this electric motor 101 is set so that when the attraction force of the inner peripheral permanent magnets 109 and the outer peripheral permanent magnet 150 acts between the inner periphery side rotor 106 and the first rotor layer 105A, the repulsion force of the inner peripheral permanent magnets 109 and the outer peripheral permanent magnet 153 acts between the inner periphery side rotor 106 and the second rotor layer 105B, and conversely, when the repulsion force of the inner peripheral permanent magnets 109 and the outer peripheral permanent magnet 150 acts between the inner periphery side rotor 106 and the first rotor layer 105A, the attraction force of the inner peripheral permanent magnets 109 and the outer peripheral permanent magnet 153 acts between the inner periphery side rotor 106 and the second rotor layer 105B, overall the attraction and repulsion forces between the inner periphery side rotor 106 and the outer periphery side rotor 105 can almost offset each other.

Figure 10:
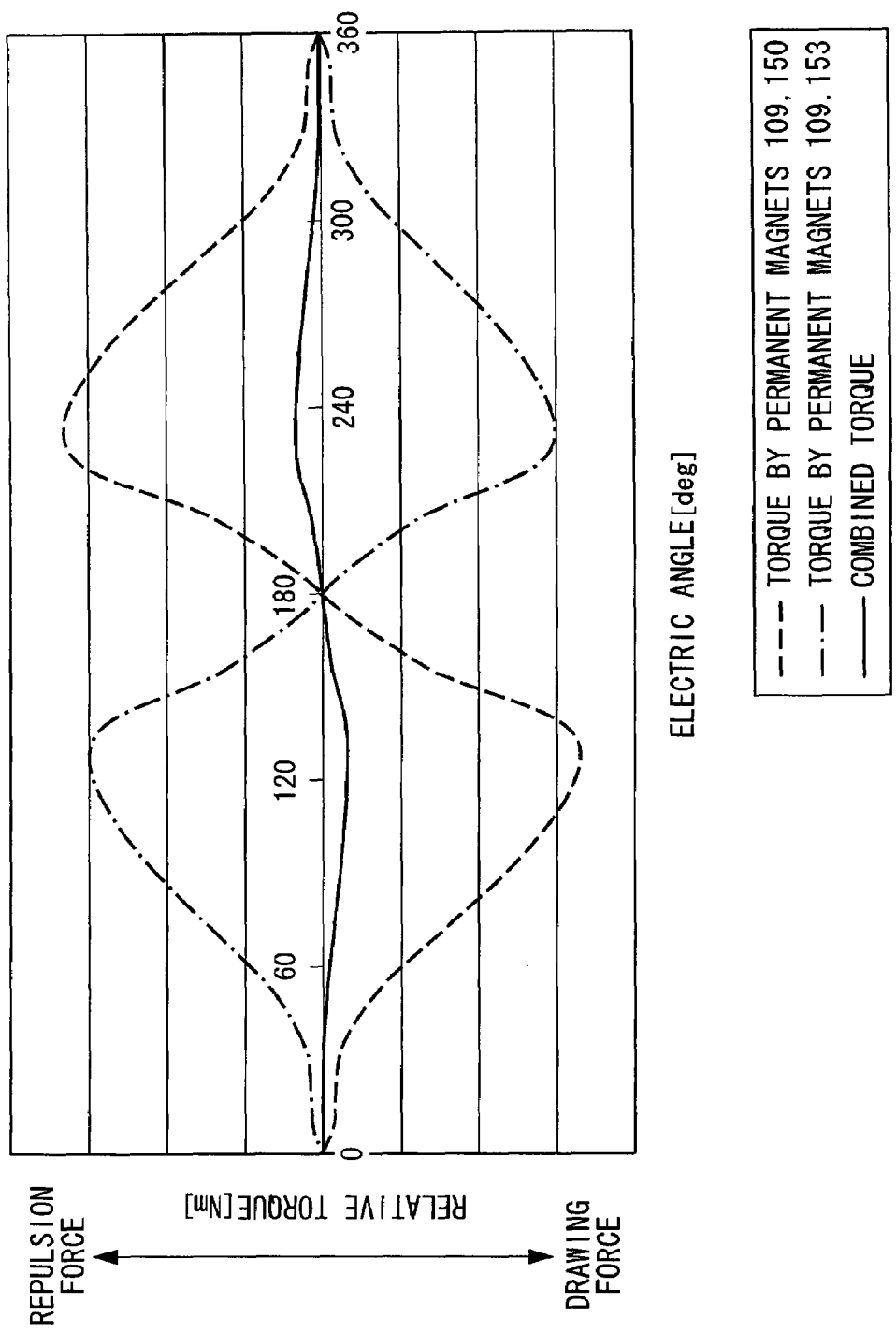
FIG. 10 is a characteristic chart showing the relation between the relative torque and electric angle in the same embodiment.

In FIG. 10, the dashed line shows the variation in torque produced by the inner peripheral permanent magnets 109 and the outer peripheral permanent magnets 150 on the first rotor layer 105A side when the inner periphery side rotor 106 and the outer periphery side rotor 105 are rotated relative to each other, and the dash-dot line shows the variation in torque produced by the inner peripheral permanent magnets 109 and the outer peripheral permanent magnets 153 on the second rotor layer 105B side. The solid line shows the variation in the combined torque from these sources. This characteristic chart shows that in the electric motor 101 of the present embodiment, the overall level of relative torque of the inner peripheral permanent magnets 109 and the outer peripheral permanent magnets 150 and 153 which acts between the inner periphery side rotor 106 and the outer periphery side rotor 105 is low, and the fluctuation range is small.

Accordingly, because in this electric motor 101 the effect of the attraction and repulsion forces of the inner peripheral permanent magnets 109 and the outer peripheral permanent magnets 150 and 153 can be minimized when the phase between the inner periphery side rotor 106 and the outer periphery side rotor 105 is changed, the amount of energy lost to phase changing can be reduced, and the rotating mechanism 111 and hydraulic pump (not shown) can be reduced in size. Furthermore, another advantage is that because the fluctuation range of the overall relative torque of the inner peripheral permanent magnets 109 and the outer peripheral permanent magnets 150 and 153 is small, the hydraulic control apparatus can achieve phase control easily and in a reliable manner.

In addition, in the electric motor 101 of the present embodiment, because the second rotor layer 105B is sandwiched between a pair of first rotor layers 105A, the reaction forces that act on the outer periphery side rotor in the attraction and repulsion directions attain an overall balance in the axial direction, providing a favorable internal stress balance and more stable phase control.

Moreover, the outer periphery side rotor 105 may be simply coupled to the two rotor layers 105A and 105B in the axial direction, although this does not offer the same advantages in terms of balance described above. Furthermore, two or more of each of the rotor layers 105A and 105B may be provided in an alternating pattern in the axial direction.

Furthermore, in the electric motor 101, the magnetic reaction force that acts between the inner peripheral permanent magnets 109 and the outer peripheral permanent magnets 150 and the magnetic reaction force that acts between the inner peripheral permanent magnets 109 and the outer peripheral permanent magnets 153 can be set so that the absolute values of the two magnetic reaction forces are substantially the same when the rotors 106 and 105 are at any given position relative to each other, or alternatively, the absolute value of one of these magnetic reaction forces may be larger than the other. This can allow the relative phase to automatically return to the strong magnetic field side or the weak magnetic field side, for example, whenever the rotating mechanism 111 is inactive.

EMBODIMENT 3

Figure 11:
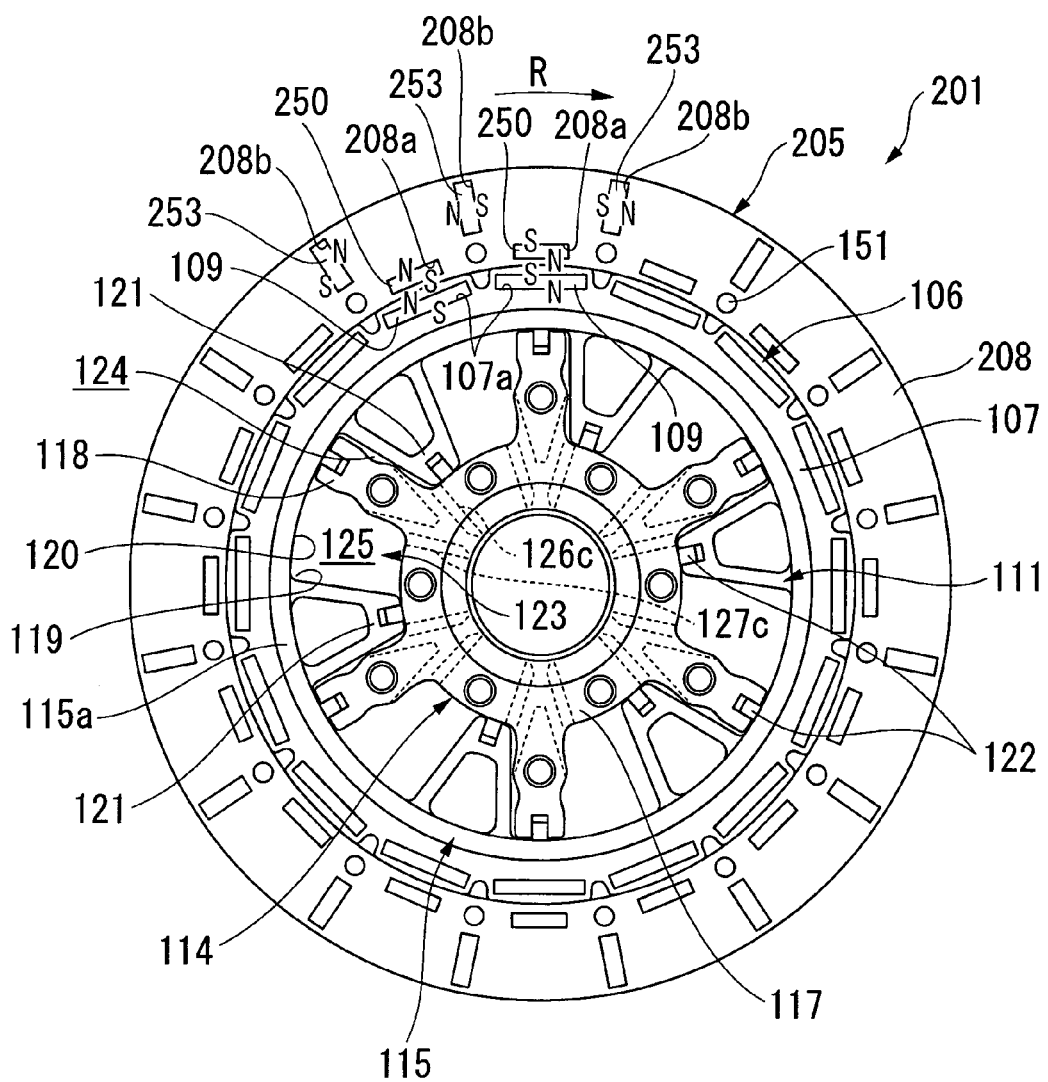
FIG. 11 is a side view showing the rotor unit in a third embodiment of the present invention.
Figure 12:
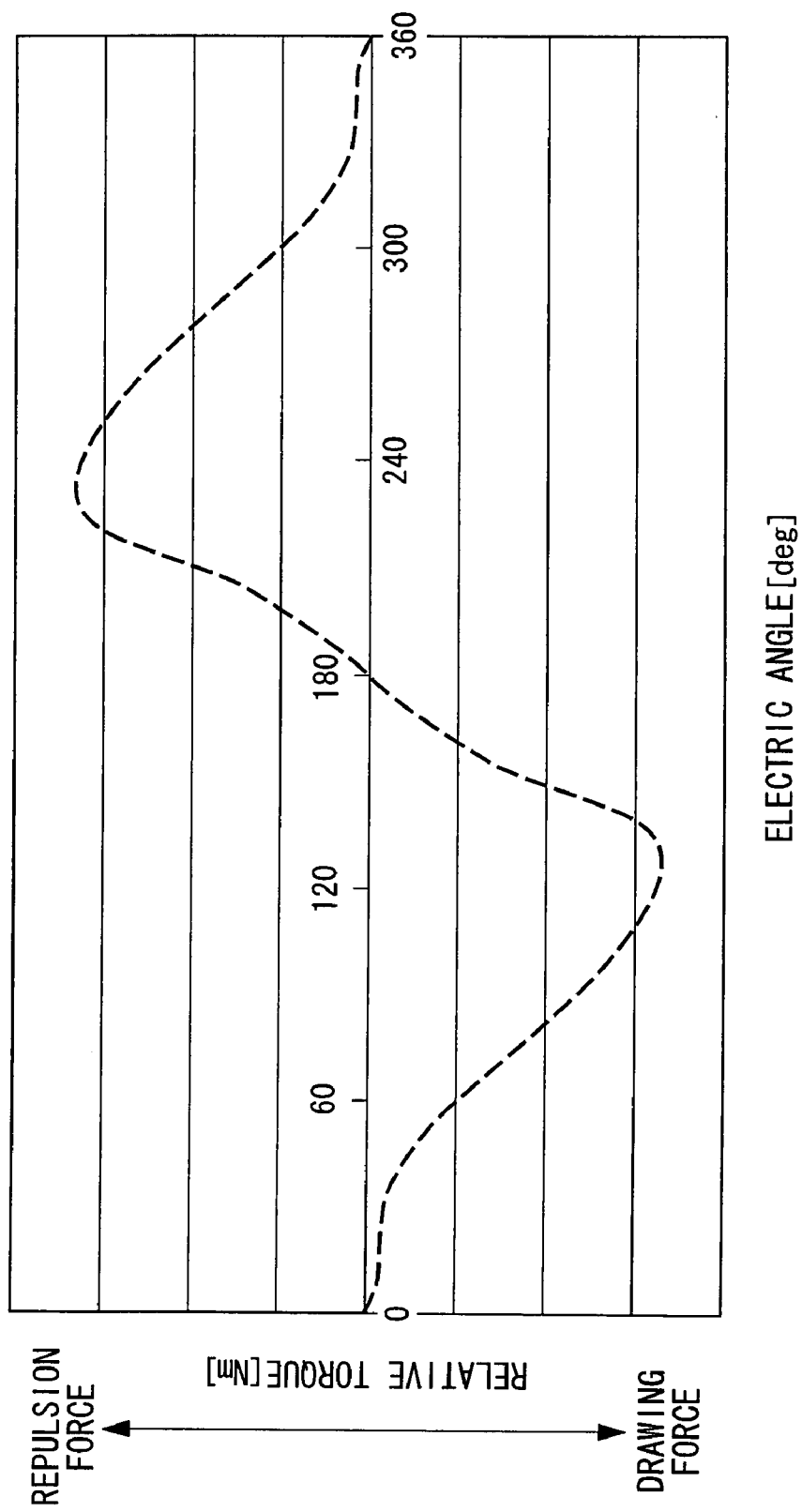
FIG. 12 is a characteristic chart showing the relation between the relative torque and electric angle in the related art.

FIG. 11 is a partial cross-sectional side view showing the portion of the third embodiment that corresponds to FIG. 7 and FIG. 8 of the second embodiment. Although the third embodiment is described below, those elements that are the same as in the second embodiment are given the same reference numerals and parts of the explanation that overlap are omitted.

An electric motor 201 according to the present embodiment is the same as the second embodiment in the placement of the rotors (not shown) and the rotor unit 103 and in the construction of the rotating mechanism 111, but differs from the second embodiment in the construction of the outer periphery side rotor 105.

In other words, the outer periphery side rotor 105 of this electric motor 201, instead of combining two types of rotor layer with different cross-sectional constructions as in the outer periphery side rotor 105 of the second embodiment, has a substantially uniform cross sectional structure along the entire axial direction as shown in FIG. 11. In a rotor core 208, magnet attachment slots 208a which have a rectangular opening along the tangential direction and are formed in parallel with the axis of the outer periphery side rotor 105, and magnet attachment slots 208b which have a rectangular opening along the radial direction and are formed in parallel with the axis of the outer periphery side rotor 105, are each formed at equal intervals around the circumferential direction, and outer peripheral permanent magnets 250 and secondary outer peripheral permanent magnets 253 are attached to the magnet attachment slots 208a and 208b, respectively. The outer peripheral permanent magnets 250 and secondary outer peripheral permanent magnets 253 all have a flat shape, and are magnetized in the thickness direction. Furthermore, the magnetization direction of the outer peripheral permanent magnets 250 when attached to the magnet attachment slots 208a is the radial direction, and the magnetic poles of adjacent magnets along the circumferential direction are unlike poles. Furthermore, the magnetization direction of the secondary outer peripheral permanent magnets 253 when attached to the magnet attachment slots 208b is substantially the circumferential direction, and adjacent magnets along the circumferential direction face each other via like magnetic poles.

With this electric motor 201 also, the outer peripheral permanent magnets 250 enter the strong magnetic field state when facing unlike poles of the inner peripheral permanent magnets 109 of the inner periphery side rotor 206, and enter the weak magnetic field state when facing like poles. On the other hand, the secondary outer peripheral permanent magnets 253 enter the strong magnetic field state when the magnetic poles of the areas between like poles of the secondary outer peripheral permanent magnets 253 faces the like poles of the inner peripheral permanent magnets 109 of the inner periphery side rotor 106, and enter the weak magnetic field state when the magnetic poles of the areas between like poles of the secondary outer peripheral permanent magnets 253 face the unlike poles of the inner peripheral permanent magnets 109 of the inner periphery side rotor 106.

Accordingly, with this electric motor 201, because the magnetic field system of the outer peripheral permanent magnets 250 and the magnetic field system of the secondary outer peripheral permanent magnets 253 combine in a manner that causes the strength and weakness peaks of the two to substantially coincide, the variable ratio of the magnetic field system can be sufficiently large, and because the attraction and repulsion forces of the outer peripheral permanent magnets 250 are always contrary to the attraction and repulsion forces of the secondary outer peripheral permanent magnets 253, the effect of the attraction and repulsion forces of the permanent magnets 109, 250, and 253 during phase changing can be minimized and the amount of energy lost to phase changing can be reduced, while also allowing the size of the rotating mechanism 111 and the hydraulic pump for driving the mechanism to be reduced.

The electric motor 201 of the present embodiment offers substantially the same advantages as the second embodiment in addition to those described above, but also offers a further advantage in that the uniform cross section of the outer periphery side rotor 205 allows manufacturing of the outer periphery side rotor 205 to be simplified, and therefore, manufacturing costs to be reduced.

Note that this invention is not limited to the embodiments described above, and various modifications are possible provided they do not depart from the intended scope. For example, in the third embodiment described above, the outer peripheral permanent magnets 250 and secondary outer peripheral permanent magnets 253 are arranged in an alternating pattern around the circumferential direction, but alternatively, the secondary outer peripheral permanent magnets 253 can be arranged at equal intervals around the circumferential direction, and the outer peripheral permanent magnets 250 provided only in some of the areas between like poles of adjacent secondary outer peripheral permanent magnets 253.

The second and third embodiments described above can be summarized as follows.

(7) The electric motor according to the seventh aspect is provided with an inner periphery side rotor (for example the inner periphery side rotor 106 in the embodiments) having a plurality of inner peripheral permanent magnets (for example the inner peripheral permanent magnets 109 in the embodiments) provided along the circumferential direction, an outer periphery side rotor (for example the outer periphery side rotor 105 in the embodiments) which is provided on the outside of the inner periphery side rotor in a coaxial manner so as to be capable of relative rotation and has a plurality of outer peripheral permanent magnets (for example the outer peripheral permanent magnets 150 and 153 in the embodiments) provided along the circumferential direction, and a phase changing device (for example the rotating mechanism 111 in the embodiments) which changes the relative phase of the inner periphery side rotor and outer periphery side rotor by performing relative rotation of the two, wherein the inner peripheral permanent magnets have a magnetization direction oriented substantially in the radial direction and are arranged to form an alternating pattern of unlike poles along the circumferential direction, and the outer periphery side rotor includes; a first rotor layer (for example the first rotor layer 105A in the embodiments) whose outer peripheral permanent magnets have a magnetization direction oriented substantially in the radial direction and form an alternating pattern of unlike poles along the circumferential direction, and a second rotor layer (for example the second rotor layer 105B in the embodiments) whose outer peripheral permanent magnets have a magnetization direction oriented substantially in the circumferential direction and are arranged so that the like poles of adjacent magnets in the circumferential direction face each other.

With the electric motor according to the seventh aspect, between the inner periphery side rotor and the first rotor layer of the outer periphery side rotor, during the transition from the strong magnetic field state in which the unlike poles of the inner peripheral permanent magnets and outer peripheral permanent magnets face each other to the weak magnetic field state in which the like poles thereof face each other, the magnetic force that was acting in the attraction direction, for example, instead acts in the repulsion direction. Furthermore, between the inner periphery side rotor and the second rotor layer of the outer periphery side rotor, during the transition from the strong magnetic field state in which the magnetic poles of the inner peripheral permanent magnets face like magnetic poles of the outer peripheral permanent magnets on both sides in the direction of rotation, to the weak magnetic field state in which the magnetic poles of the inner peripheral permanent magnets face unlike magnetic poles of the outer peripheral permanent magnets on both sides in the direction of rotation, the magnetic force that was acting in the repulsion direction, for example, instead acts in the attraction direction. Accordingly, by using a setting in which the state of the magnetic field system between the inner periphery side rotor and the first rotor layer matches the state of the magnetic field system between the inner periphery side rotor and the second rotor layer, a large variable ratio can be secured for the magnetic field system between the inner periphery side rotor and outer periphery side rotor, and the magnetic forces between the inner periphery side rotor and first rotor layer and between the inner periphery side rotor and second rotor layer can be used in such a direction as to offset each other.

Thus, because the magnetic forces between the inner periphery side rotor and the first rotor layer and the magnetic forces between the inner periphery side rotor and the second rotor layer can offset each other without reducing the variable ratio of the magnetic field system, the influence of the attraction and repulsion forces during changing of the relative phase between the inner periphery side rotor and the outer periphery side rotor can be minimized, and as a result, the energy lost to the phase changing process can be reduced, and the size of the phase changing device can also be reduced.

(8) An eighth aspect of the invention is an electric motor according to the seventh aspect, in which the outer peripheral permanent magnets are set so that the attraction and repulsion forces applied to the inner peripheral permanent magnets from the first rotor layer side are the inverse of the attraction and repulsion forces applied from the second rotor layer side at an arbitrary relative phase between the inner periphery side rotor and the outer periphery side rotor.

In this case, because the attraction and repulsion forces between the inner periphery side rotor and the first rotor layer are always the inverse of those between the inner periphery side rotor and the second rotor layer, the influence of the attraction and repulsion forces of permanent magnets during changing of the relative phase between the inner periphery side rotor and the outer periphery side rotor can be reliably reduced.

(9) A ninth aspect of the invention is an electric motor according to the seventh or eighth aspects, in either one of the first rotor layer and the second rotor layer may be disposed at the center in the axial direction of the outer periphery side rotor, and the other disposed on both sides thereof in the axial direction.

In this case, because the reaction forces that act in the outer periphery side rotor in the attraction and repulsion directions attain an overall balance in the axial direction, more stable phase control between the inner periphery side rotor and outer periphery side rotor can be achieved.

(10) An electric motor according to a tenth aspect of the invention is provided with an inner periphery side rotor (for example the inner periphery side rotor 106 in the embodiments) having a plurality of inner peripheral permanent magnets (for example the inner peripheral permanent magnets 109 in the embodiments) provided along the circumferential direction, an outer periphery side rotor (for example the outer periphery side rotor 205 in the embodiments) which is provided on the outside of the inner periphery side rotor in a coaxial manner so as to be capable of relative rotation and has a plurality of outer peripheral permanent magnets (for example the outer peripheral permanent magnets 250 in the embodiments) provided along the circumferential direction, and a phase changing device (for example the rotating mechanism 111 in the embodiments) which changes the relative phase of the inner periphery side rotor and outer periphery side rotor by performing relative rotation thereof, wherein the inner peripheral permanent magnets are magnetized substantially in the radial direction and are arranged to form an alternating pattern of unlike poles along the circumferential direction, and in the outer periphery side rotor, the outer peripheral permanent magnets which are magnetized substantially in the radial direction are arranged so that an alternating pattern of unlike poles is formed along the circumferential direction, and secondary outer peripheral permanent magnets (for example the secondary outer peripheral permanent magnets 253 in the embodiment) which are magnetized substantially in the circumferential direction are arranged so that the like poles of adjacent magnets in the circumferential direction face each other.

According to this electric motor, during the transition from the strong magnetic field state in which unlike poles of the inner peripheral permanent magnets and outer peripheral permanent magnets face each other to the weak magnetic field state in which like poles thereof face each other, the magnetic force between the inner peripheral permanent magnets and outer peripheral permanent magnets that was acting in the attraction direction, for example, instead acts in the repulsion direction. Furthermore, during the transition from the strong magnetic field state in which the magnetic poles of the inner peripheral permanent magnets face like magnetic poles of the secondary outer peripheral permanent magnets on both sides in the direction of rotation, to the weak magnetic field state in which the magnetic poles of the inner peripheral permanent magnets face unlike magnetic poles of the secondary outer peripheral permanent magnets on both sides in the direction of rotation, the magnetic force between the inner peripheral permanent magnets and secondary outer peripheral permanent magnets that was acting in the repulsion direction, for example, instead acts in the attraction direction. Accordingly, by using a setting in which the state of the magnetic field system between the inner peripheral permanent magnets and outer peripheral permanent magnets matches the state of the magnetic field system between the inner peripheral permanent magnets and secondary outer peripheral permanent magnets, a large variable ratio can be secured for the magnetic field system between the inner periphery side rotor and the outer periphery side rotor, and the magnetic forces between the inner peripheral permanent magnets and outer peripheral permanent magnets and between the inner peripheral permanent magnets and secondary outer peripheral permanent magnets can be used in such a direction as to offset each other.

Thus, because the magnetic forces between the inner peripheral permanent magnets and the outer peripheral permanent magnets and the magnetic forces between the inner peripheral permanent magnets and the secondary outer peripheral permanent magnets can offset each other without reducing the variable ratio of the magnetic field system, the influence of the attraction and repulsion forces of the permanent magnets during changing of the relative phase between the inner periphery side rotor and the outer periphery side rotor can be minimized, and as a result, the energy lost to the phase changing process can be reduced, and the size of the phase changing device can also be reduced.

(11) An eleventh aspect of the invention is an electric motor according to the tenth aspect, in which the outer peripheral permanent magnets and secondary outer peripheral permanent magnets are set so that the attraction and repulsion forces applied to the inner peripheral permanent magnets from the outer peripheral permanent magnet side are the inverse of the attraction and repulsion forces applied from the secondary outer peripheral permanent magnet side at an arbitrary relative phase between the inner periphery side rotor and the outer periphery side rotor.

In this case, because the attraction and repulsion forces between the inner peripheral permanent magnets and outer peripheral permanent magnets are always the inverse of those between the inner peripheral permanent magnets and secondary outer peripheral permanent magnets, the influence of the attraction and repulsion forces of the permanent magnets during changing of the relative phase between the inner periphery side rotor and the outer periphery side rotor can be reliably reduced.

DESCRIPTION OF THE REFERENCE NUMERALS

101, 201 Electric motor
105, 205 Outer periphery side rotor
105A First rotor layer
105B Second rotor layer
106 Inner periphery side rotor
109 Inner peripheral permanent magnets
111 Rotating mechanism (phase changing device)
150, 153, 250 Outer peripheral permanent magnets
253 Secondary outer peripheral permanent magnets While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electric motor comprising:
a rotating device capable of changing a relative phase between an inner periphery side rotor having a first peripheral permanent magnets arranged along the circumferential direction and an outer periphery side rotor having a second peripheral permanent magnets arranged along the circumferential direction, the inner periphery side rotor and the outer periphery side rotor being concentric, by rotating one or the other about the rotation axis;
third permanent magnets secured integrally to the outer periphery side rotor; and
fourth permanent magnets secured integrally to the inner periphery side rotor, wherein
the third permanent magnets and the fourth permanent magnets are arranged so as to offset a relative torque produced between the outer periphery side rotor and the inner periphery side rotor based on a magnetic flux of the first peripheral permanent magnets and the second peripheral permanent magnets.

2. The electric motor according to claim 1, wherein, in a state where unlike magnetic poles of the first peripheral permanent magnets and the second peripheral permanent magnets are disposed to face each other, the third permanent magnets and the fourth permanent magnets are arranged such that like magnetic poles face each other.

3. The electric motor according to claim 1, wherein, in a state where unlike magnetic poles of the first peripheral permanent magnets and the second peripheral permanent magnets are disposed to face each other, the third permanent magnets and the fourth permanent magnets are arranged such that unlike magnetic poles face each other along the direction of rotation of the rotating device.

4. The electric motor according to claim 2 or claim 3, wherein
the third permanent magnets and the fourth permanent magnets are disposed to face each other along the radial direction of the outer periphery side rotor and the inner periphery side rotor.

5. The electric motor according to claim 2 or claim 3, wherein
the third permanent magnets and the fourth permanent magnets are arranged to face each other along the axial direction of the outer periphery side rotor and the inner periphery side rotor.

6. The electric motor according to claim 2 or claim 3, wherein:
the rotating device comprises a first member which rotates integrally with the outer periphery side rotor, and a second member which rotates integrally with the inner periphery side rotor and which together with the first member forms pressure chambers on the inside of the inner periphery side rotor, such that the relative phase between the outer periphery side rotor and the inner periphery side rotor can be changed by supplying hydraulic fluid to the pressure chambers; and
the first member comprises the third permanent magnets, and the second member comprises the fourth permanent magnets.

7. The electric motor according to claim 2, wherein
the third permanent magnets and the fourth permanent magnets are disposed in a position such that an amount of interference applied by magnetic fluxes of the third permanent magnets and the fourth permanent magnets to a field magnetic flux of the first peripheral permanent magnets and the second peripheral permanent magnets which links to stator windings is kept below a predetermined level.

8. The electric motor according to claim 1, wherein:
the first permanent magnets and the fourth permanent magnets are the same, and
the first peripheral permanent magnets which serve as the fourth permanent magnets are magnetized in substantially the radial direction and are disposed such that each magnetic pole faces the unlike pole of the adjacent magnet in the circumferential direction; and
the outer periphery side rotor comprises
a first rotor layer in which the third permanent magnets magnetized substantially in the radial direction are arranged such that each magnetic pole faces the unlike pole of the adjacent permanent magnet in the circumferential direction, and
a second rotor layer in which the second peripheral permanent magnets magnetized substantially in the circumferential direction are arranged so that each magnetic pole faces the like pole of the adjacent permanent magnet in the circumferential direction.

9. The electric motor according to claim 8, wherein
the second peripheral permanent magnets and the third permanent magnets are set so that the attraction and repulsion forces applied to the first peripheral permanent magnets from the first rotor layer side are the inverse of the attraction and repulsion forces applied from the second rotor layer side at an arbitrary relative phase between the inner periphery side rotor and the outer periphery side rotor.

10. The electric motor according to either one of claim 8 or claim 9, wherein,
in the outer periphery side rotor, either one of the first rotor layer and the second rotor layer is disposed at the center in the axial direction, and the other is disposed on both sides thereof in the axial direction.

11. The electric motor according to claim 1, wherein:
the first peripheral permanent magnets are magnetized in substantially the radial direction and are arranged such that each magnetic pole faces the unlike pole of the adjacent permanent magnet in the circumferential direction; and
the outer periphery side rotor comprises the third permanent magnets magnetized substantially in the radial direction which are arranged such that each magnetic pole faces the unlike pole of the adjacent permanent magnet in the circumferential direction, and
the second peripheral permanent magnets magnetized substantially in the circumferential direction which are arranged such that each magnetic pole faces the like pole of the adjacent permanent magnet in the circumferential direction.

12. The electric motor according to claim 11, wherein the third permanent magnets and the second peripheral permanent magnets are set so that at an arbitrary relative phase of the inner periphery side rotor and the outer periphery side rotor, the attraction and repulsion forces that apply to the first peripheral permanent magnets from the third permanent magnet side are the inverse of those that apply from the second peripheral permanent magnet side.

* * * * *